United States Patent
Toyoda et al.

[15] 3,693,479
[45] Sept. 26, 1972

[54] AUTOMATIC TRANSMISSION SYSTEM HAVING A VARIABLE SPEED CHANGING POINT

[72] Inventors: Eiji Toyoda, Toyota-shi; Masaaki Noguchi, Chikusa-ku; Osamu Ito, Toyota-shi, all of Japan

[73] Assignees: Nippondenso Kabushiki Kaisha, Kariya-shi, Aichi-ken; Toyota Jidosha Kogyo Kabushiki Kasha, Toyota-shi, Japan

[22] Filed: Nov. 10, 1969

[21] Appl. No.: 875,070

[30] Foreign Application Priority Data

March 25, 1969 Japan .....................44/22826

[52] U.S. Cl. .................................74/731, 74/866
[51] Int. Cl. ........................F16h 47/08, B60k 31/00
[58] Field of Search....................74/731, 645, 866

[56] References Cited

UNITED STATES PATENTS

| | | | |
|---|---|---|---|
| 2,498,600 | 2/1950 | Brunken | 74/645 X |
| 2,529,129 | 11/1950 | Blair | 74/731 |
| 3,007,351 | 11/1961 | Hilpert | 74/731 X |
| 3,068,715 | 12/1962 | Brennan et al. | 74/866 X |
| 3,122,940 | 3/1964 | Shimwell et al. | 74/866 |
| 3,301,085 | 1/1967 | De Castelet | 74/866 |
| 3,439,564 | 4/1969 | Scholl et al. | 74/866 |
| 3,448,640 | 6/1969 | Nelson | 74/866 |
| 2,995,949 | 8/1961 | Gelenius et al. | 74/866 |
| 3,354,744 | 11/1967 | Kuhnle et al. | 74/866 X |

FOREIGN PATENTS OR APPLICATIONS 446,979  5/1936  Great Britain...............74/731

*Primary Examiner*—Carlton R. Croyle
*Assistant Examiner*—Thomas C. Perry
*Attorney*—Cushman, Darby & Cushman

[57] ABSTRACT

An automatic transmission system in which the factor related to the load on the engine such as the degree of depression of the accelerator pedal, the negative pressure in the air intake pipe or the slippage of the torque converter and the factor related to the revolution of the engine such as the velocity of air flow into the engine or the number of revolutions of the input shaft of the transmission are the main factors for determining the speed changing point, and speed changing instructions are issued by an electrical control device including a logical operation circuit and transistor relay circuit. In the system, the settings such as the slip ratio of the torque converter, the vehicle speed and the number of revolutions of the engine for determining the speed changing point are changed over by switch means which is manipulated as is desired.

3 Claims, 32 Drawing Figures

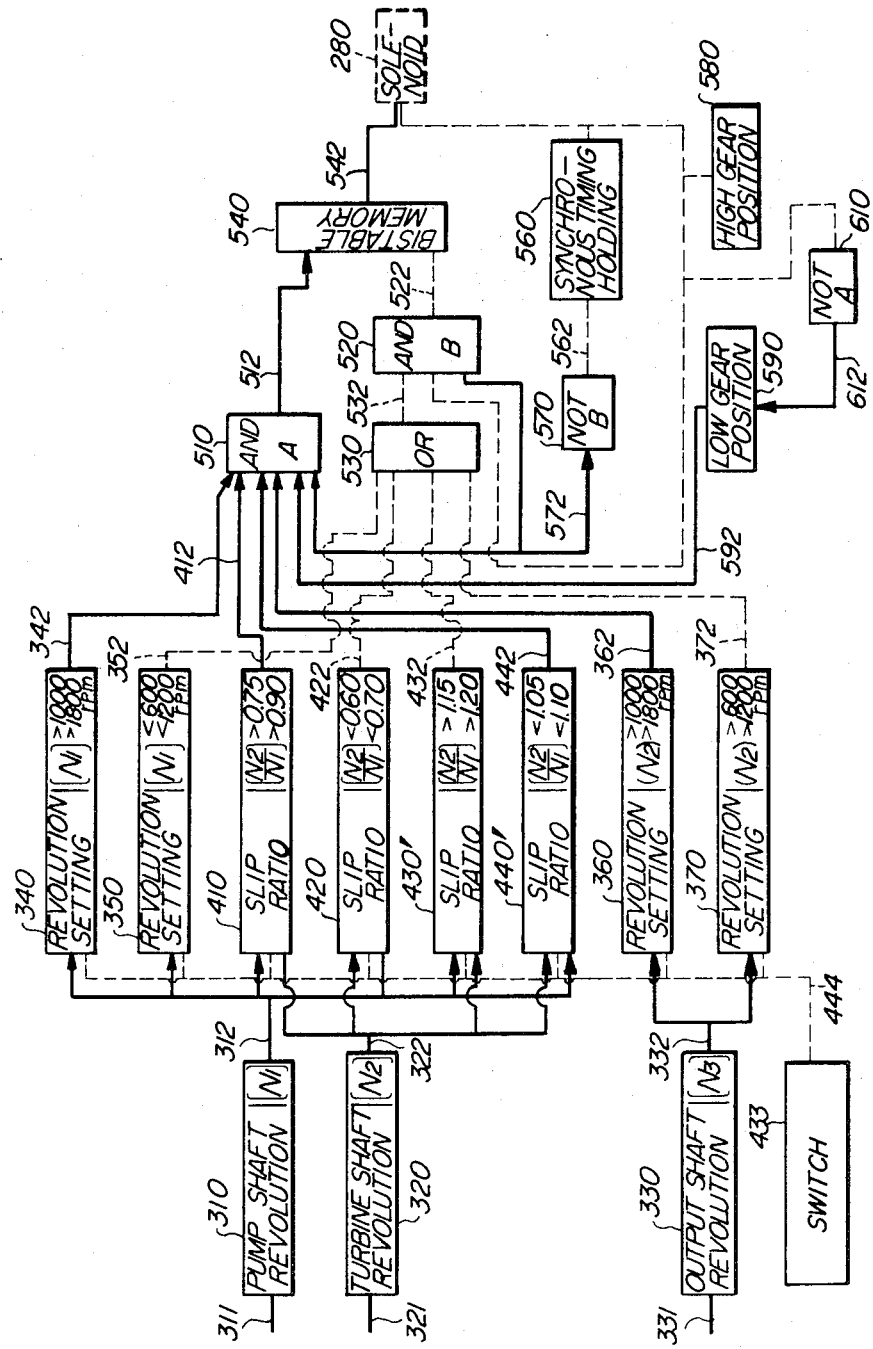

AUTOMATIC TRANSMISSION SYSTEM HAVING A VARIABLE SPEED CHANGING POINT

This invention relates to a transmission system for automotive vehicles and the like, and more particularly to an automatic transmission system comprising a hydraulic torque converter and multi-speed gear transmission means.

In an automatic transmission system employed heretofore in common passenger cars, the speed changing point is generally determined from a signal representing the vehicle speed (taken from the output shaft of a multi-speed gear transmission means) or a signal representing the revolution of the prime mover or internal combustion engine and a signal representing the negative pressure (boost pressure) in the air intake pipe of the internal combustion engine or a signal representing the amount of depression of the accelerator pedal actuated by the driver. A commonly employed method comprises obtaining these signals in the form of a high and a low hydraulic pressure, determining the speed changing point on the basis of the interrelation between these two hydraulic pressures, and opening and closing related valves for selectively hydraulically operating an actuator such as a multiple disc clutch and a brake band. Thus, in the conventional automatic transmission system which is wholly controlled by means of hydraulic pressure, the detected signals in the form of hydraulic pressures are subjected to errors and are therefore generally inaccurate. This means that the speed changing point is also frequently subjected to error. Further, the hydraulic actuating circuit is generally complex and it is not an easy matter to impart thereto an improved function over the existing function. For example, when the vehicle going up a relatively steep slope encounters a relatively gentle incline, a slight release of the depression pressure imparted to the accelerator pedal for the purpose of maintaining the vehicle speed requires gear changing into high gear. Then when the vehicle encounters a steep incline, depression of the accelerator pedal for the purpose of maintaining the vehicle speed would not cause gear changing into low gear until the vehicle speed is considerably reduced, thus putting the drivers inconvenience.

Moreover, when the vehicle is running on a level road or going down a gentle decline, the depression of the accelerator pedal for the purpose of acceleration would not cause gear changing into high gear until the vehicle speed becomes substantially equal to that developed while going up the slope and a gear changing under such circumstances is quite unsatisfactory in that considerable noise is developed from the engine and transmission means. Further, the load on the road-engaging wheels varies depending on variations in the number of passengers or weight of goods carried by the vehicle and on whether the vehicle runs in an urban area or in a suburban area, and similarly unsatisfactory gear changing results. This is because the speed is changed on the basis of a predetermined single speed changing diagram for all of the conditions including going up a steep slope, going down a steep decline, abrupt acceleration on a level road, moderate acceleration on a level road, running on a level road at a constant speed, and a great variation in the load during running in an urban area and running in a suburban area. In other words, the above difficulties arise from the fact that a speed changing line which is satisfactory for an intermediate load and which can deal to a certain extent with a large and a small load is not selected.

Generally, such difficulties are avoided by manually changing the gear means into low gear and preventing it from shifting to high gear.

It is a primary object of the present invention to provide an automatic transmission system having a torque converter, transmission unit and a hydraulic actuating circuit, said system comprising an electrical control device for determining the speed changing point from the revolution of the internal combustion engine and the negative pressure in the air intake pipe or the speed of revolution of the engine and the slip ratio or the like of the torque converter for controlling a distributing valve in said hydraulic actuating circuit, and switch means associated with said electrical control device, said switch means being capable of varying the setting of said electrical control device so as to vary the speed changing point (line) to deal with great variations in the load.

The present invention is featured by the fact that, in an automatic transmission system of the kind in which the factor related to the load of the engine, such as the degree of depression of the accelerator pedal, the negative pressure in the air intake pipe or the amount of slip of the torque converter and the other factors related to the revolution of the engine such as the velocity of air flowing into the engine and the revolution of the input shaft of the transmission unit serve as the main factors for determining the speed changing point, and an electrical control device including a logical operation circuit or transistor relay circuit delivers speed changing instructions, the settings for determining the speed changing point in the electrical control device such as the slip ratio of the torque converter, the vehicle speed and the revolution of the engine are varied in response to the switching operation by switch means depending on a variation in the condition of the road surface or in the weight of goods carried by the vehicle or on whether the vehicle is running in an urban or suburban area. According to the present invention, therefore, the transmission unit is not continuously fixed at a low gear position when it is so set unlike the prior case of manually shifting the gear to low gear, and gear changing from low to high gear is effected any time depending on the value of the speed changing point determining factors so as to enable running in the most appropriate gear position.

In the present invention, an electrical control device is employed to control the distributing valve in the hydraulic actuating circuit as described above. Accordingly, the speed changing point can be determined with high precision and the necessary setting can easily be obtained. Further, switch means is connected with the electrical control device to vary the setting of the electrical control device by the switching operation of same. Accordingly, the required speed changes can be realized exactly by merely varying the speed changing point. Thus, mere addition of the switch means to the electrical control device without appreciably varying the arrangement of the electrical control device provides an inexpensive automatic transmission system of a relatively simple structure.

In the present invention, the electrical control device is composed of revolution setting operating circuits, slip operating circuits and logic circuits for actuating the distributing valve in the hydraulic actuating circuit. Thus, an automatic speed change can satisfactorily be effected even in the case of engine braking in which case the driving force is transmitted from the wheels to the engine and the speed changing point in the case of engine braking can be selected as desired.

FIG. 17 is a block diagram illustrating the manner of logical operation for gear changing from low to high gear under both a light and a heavy load.

A two-forward speed automatic transmission system will be taken as a typical example of the present invention and its structure and function will be described in detail hereunder. It will be understood, however, that the present invention is in no way limited to such a two-forward speed automatic transmission system and is similarly applicable to a three or more forward speed automatic transmission system.

STRUCTURE OF A TWO-FORWARD SPEED TORQUE CONVERTER TRANSMISSION UNIT

Figure 1:
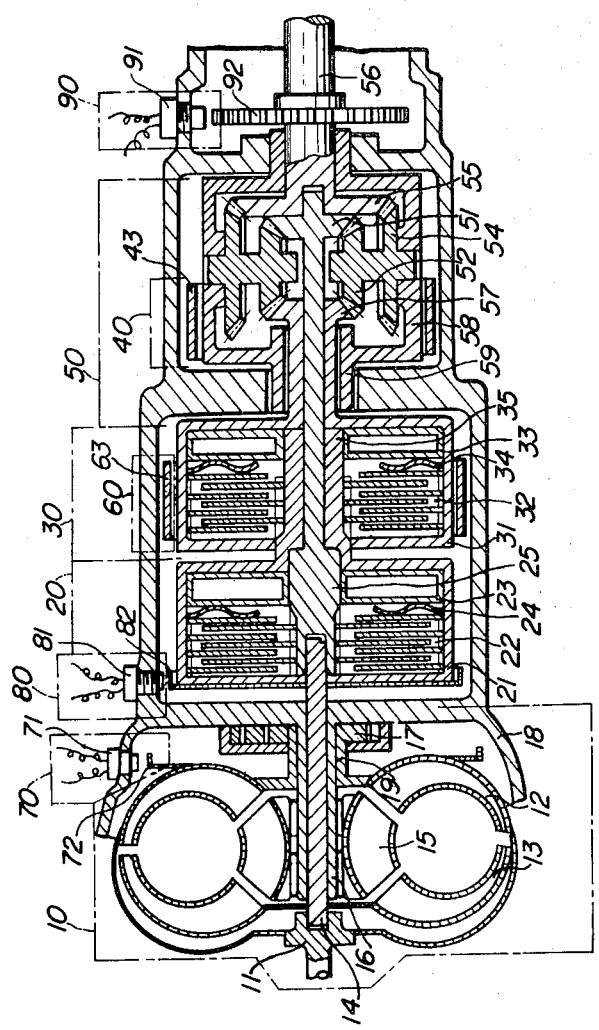
FIG. 1 is a sectional view of a transmission unit preferably used in an automatic transmission system embodying the present invention.

Referring to FIG. 1, the two-forward speed torque converter transmission unit comprises a hydraulic torque converter 10, a front clutch 20, a rear clutch 30, a rear brake 40 and a gear train 50. At the input side of the hydraulic torque converter 10, the rotary output shaft of an engine (not shown) is directly connected to a shaft 11 which is in turn directly connected to a torque converter pump 12. The torque converter 10 includes the torque converter pump 12, a torque converter turbine 13 disposed opposite to the pump 12, and a stator 15 disposed between the pump 12 and the turbine 13. The stator 15 is provided with a one-way clutch 16. Since the operation of these elements is well known in the art, any detailed description will not be given herein. The torque converter pump 12 discharges a circulating flow of hydraulic fluid and the torque converter turbine 13 is driven by the momentum of such a circulating flow to transmit a driving force to the shaft 14 of the torque converter turbine 13. Thus, a difference exists between the rotation of the torque converter pump 12 and the rotation of the torque converter turbine 13 and the rotating force is transmitted with such a rotational difference. With a small rotational difference, a small torque is transmitted, while with a large rotational difference, a large torque is transmitted. The torque converter 10 performs the function of transmitting a varying rotational force. According to another expression, the rotational difference is expressed by a revolution ratio or slip ratio.

A hydraulic pump 17 which may be a gear pump is directly connected to the pump shaft 11 for a purpose which will be described later. The front clutch 20 is composed of a clutch drum 21 connected integrally with the turbine shaft 14, a multiple disc clutch 22, a clutch piston 23, a spring plate 24 and a clutch shaft 25. When an actuating hydraulic pressure is applied to the clutch piston 23, the clutch 22 acts to couple the shaft 14 of the torque converter turbine 13 to the clutch shaft 25.

The rear clutch 30 is composed of a clutch shaft 35 connected integrally with the clutch drum 21, a clutch drum 31, a multiple disc clutch 32, a clutch piston 33 and a spring plate 34. When an actuating hydraulic pressure is applied to the clutch piston 33, the clutch 32 acts to couple the clutch drum 21 to the clutch drum 31.

Figure 2:
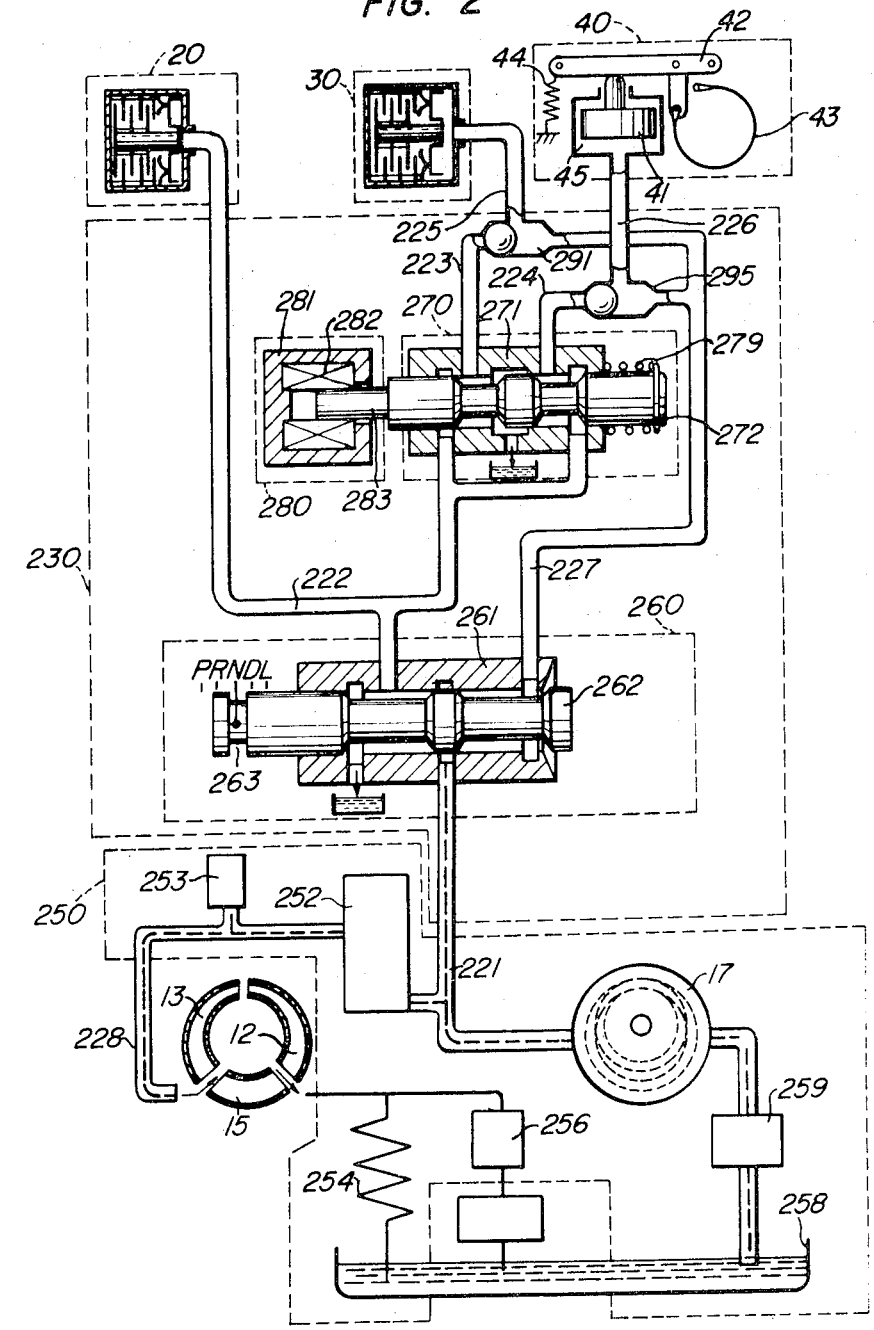
FIGS. 2, 3, 4 and 5 are diagrammatic views illustrating the operation of a hydraulic actuating circuit when the present invention is applied to a two-forward speed automatic transmission system, in which the hydraulic actuating circuit is shown in its N, DL, DH and R states, respectively.

As shown in FIG. 2, the rear brake 40 is composed of a brake piston 41, a brake link 42, a brake band 43, a return spring 44 and a brake cylinder 45. When an actuating hydraulic pressure is applied to the brake cylinder 45, the brake band 43 is actuated to lock a carrier 58 of the gear train 50 against any rotation relative to the housing 18.

These clutches and the brake are similar to those well known in the art. In regard to the gear train 50, it is composed of, for example, a first sun gear 51, a second sun gear 57, a third sun gear 55, first planetary gears 52, second planerary gears 54, an output shaft 56 and a carrier 58. That is, the gear train 50 is in the form of a planetary bevel gear mechanism in which the first sun gear 51 and the second sun gear 57 are disposed opposite to each other to mesh with each other through the first planetary gears 52, and the second planetary gears 54 are integral with the first planetary gears 52 so as to mesh with the third sun gear 55. The planetary bevel gear mechanism takes the following variable speed meshing positions: In high gear, the front clutch 20 and the rear clutch 30 are actuated so that the first sun gear 51 and the second sun gear 57 rotate at the same number of revolutions. In this state, since the carrier 58 is idle, the output shaft 56 is rotated at the same number of revolutions as the two sun gears 51 and 57 and thus rotation is transmitted in a 1 : 1 ratio, as is apparent from FIG. 1. In low gear, the front clutch 20 and the rear brake 40 are actuated so that the rotation at the number of revolutions of the input shaft is imparted to the first sun gear 51, and since the carrier 58 is locked by the rear brake 40 and the second sun gear 57 is idly rotating, the output shaft 56 is rotated at a number of revolutions which is 1/K of the number of revolutions of the input shaft. Here, K is the speed changing ratio. When reversing, the rear clutch 30 and the rear brake 40 are actuated so that the rotation of the input shaft is imparted to the second sun gear 57, and since the first sun gear 51 is idly rotating and the carrier 58 is locked by the rear brake 40, the output shaft 56 is rotated in the reverse direction at a number of revolutions which is 1/K of the number of revolutions of the input shaft.

REVOLUTION DETECTING MEANS

Means 70 for detecting the number of revolutions of the shaft 11 of the torque converter pump 12 comprises a revolution detector 71 (detail of which will be described later) mounted on the housing 18 and a toothed disc 72 mounted on the torque converter pump 12. Suppose that the number of teeth of the toothed disc 72 is $n_1$, then the revolution detector 71 detects an electrical signal $S_1$ having a frequency which is $n_1$ times the number of revolutions $N_1$ of the torque converter pump 12. Due to the fact that the rotary shaft of the internal combustion engine is integrally connected with the shaft 11 of the torque converter pump 12, the detection of the electrical signal ($S_1 = n_1 N_1$) is equivalent to the detection of the number of revolutions of the engine.

Means 80 for detecting the number of revolutions of the shaft 14 of the torque converter turbine 13 comprises a revolution detector 81 mounted on the housing 18 and a toothed disc 82 mounted on the front clutch drum 21 which is integral with the shaft 14 of the torque converter turbine 13. The revolution detector 81 may have a structure similar to that of the revolution detector 71, and the toothed disc 82 may also have a structure similar to that of the toothed disc 72. Suppose that the toothed disc 82 has $n_2$ teeth, for example, 32 teeth, then the revolution detector 81 detects an electrical signal $S_2$ having a frequency which is $n_2$ times the number of revolutions $N_2$ of the turbine shaft 14. Thus, $S_2 = n_2 N_2 = 32 \times N_2$. In lieu of detection of the number of revolutions of the shaft 14 of the torque converter turbine 13 by the detecting means 80, a value detected at another position, for example, a value detected by a means 90 for detecting the number of revolutions of the output shaft 56 may be operated in a manner as will be described later. Further, the number of revolutions of the shaft 14 of the torque converter turbine 13 may be detected at any point so long as such point is directly connected to the shaft 14 of the torque converter turbine 13.

The means 90 for detecting the number of revolutions of the output shaft 56 comprises a revolution detector 91 mounted on the housing 18 and a toothed disc 92 connected integrally with the output shaft 56. The revolution detector 91 may have a structure similar to that of the revolution detectors 71 and 81. Suppose that the number of teeth of the toothed disc 92 is $n_3$, for example, $n_3 = 32$, then the revolution detector 91 detects an electrical signal $S_3$ having a frequency which is $n_3$ times the number of revolutions $N_3$ of the output shaft 56. Thus, $S_3 = n_3 N_3 = 32 \times N_3$. The following relation holds between $S_2$ and $S_3$:

$$S_2 = K(n_2/n_3) S_3 \quad \text{or} \quad S_3 = (n_3/n_2 K) S_2$$

Where $K = (N_2/N_3)$ (speed changing ratio). It will thus be understood that the number of revolutions $N_2$ of the shaft 14 of the torque converter turbine 13 can be sought from the number of revolutions $N_3$ of the output shaft 56 by the arithmetic operation described above.

Figure 7:
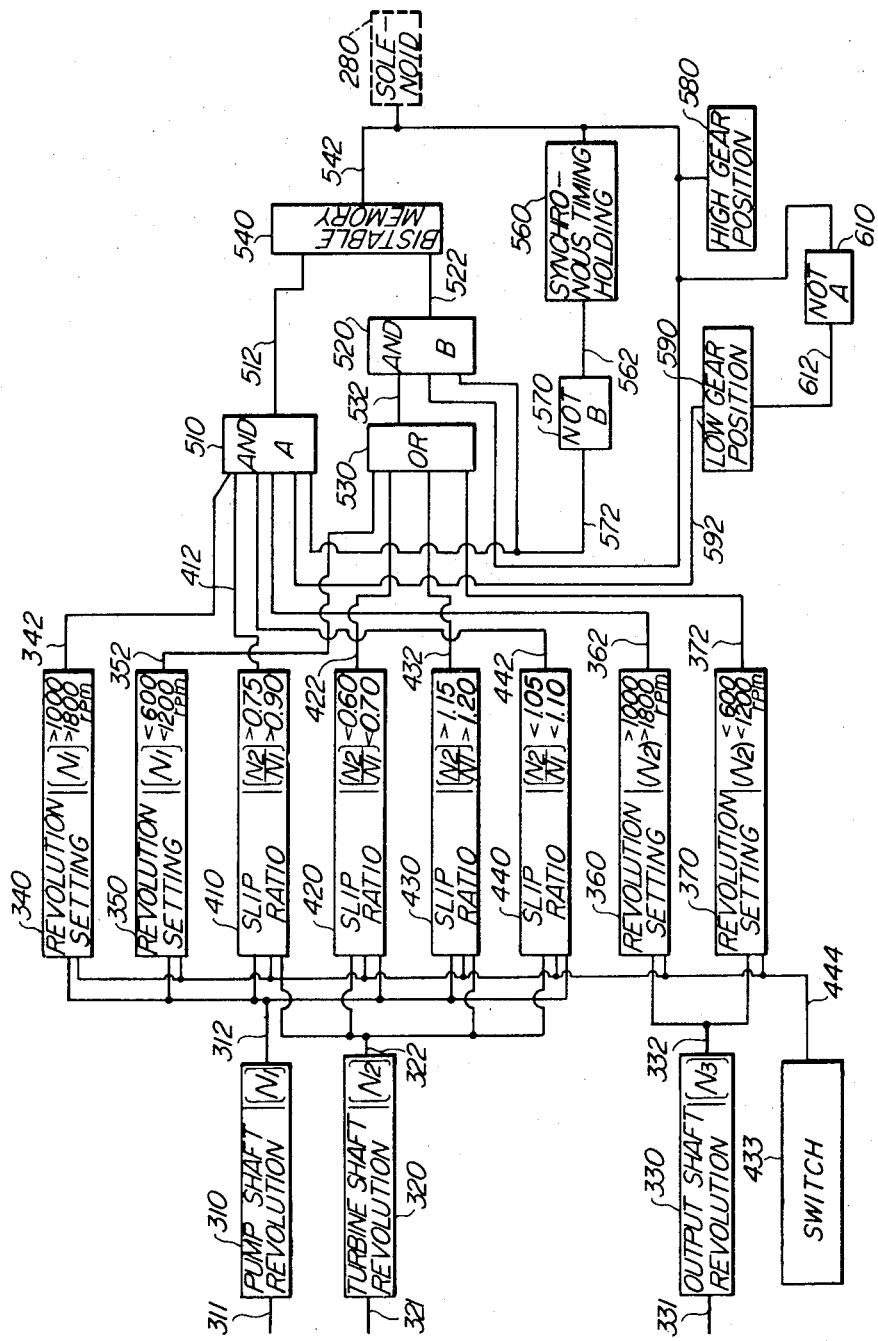
FIG. 7 is a block diagram showing the structure of an electrical control device preferably used in the embodiment of the present invention.

It is possible to eliminate one or the other of the revolution detectors 80 or 90 and their associated input detector circuits 320 or 330 by changing the values of the revolution setting circuits and the slip ratio circuits shown in FIG. 7. For example, by noting as previously described the relationship between $N_3$ and $N_2$, i.e., $N_2 = KN_3$, therefore by substituting the $KN_3$ wherever an $N_2$ is shown in FIG. 7, and eliminating the turbine shaft revolution circuit 320 and its associated detector 80 the relationship of the slip ratios and velocity is determined merely by knowing the revolution of the input shaft and the outshaft of the transmission respectively. This can be stated because certain of the circuits are only associated with a first speed operation and certain of the circuits are only associated with a high speed operation, and the logic circuits 590 and 580 respectively indicating low and high gear positions govern the operation of AND circuit 510, and OR and AND circuits 530 and 520 respectively.

Knowing the number of revolutions $N_3$ of the output shaft 56 enables the speed of the vehicle to be known. Knowing the number of revolutions $N_1$ of the shaft 11 of the torque converter pump 12 enables the number of revolutions of the engine to be known. Knowing the number of revolutions $N_2$ of the shaft 14 of the torque converter turbine 13 enables the revolution ratio between the shaft 11 of the torque converter pump 12 and the shaft 14 of the torque converter turbine 13 to be known. This means that the slip ratio of the torque converter 10 is known. It is thus possible to detect the state of power transmission in the torque converter 10 in the specific state.

Figure 8A:
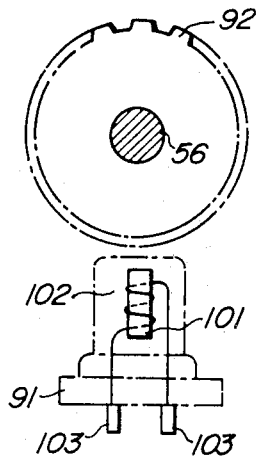
FIGS. 8a and 8b are a side elevational view and a front elevational view, respectively, of a revolution detector preferably used in the device.
Figure 8B:
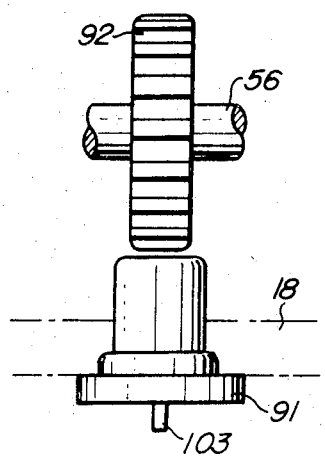

By way of example, the structure of the means 90 for detecting the number of revolutions of the output shaft 56 will be described with reference to FIGS. 8a and 8b. As seen in a side elevation in FIG. 8a, the toothed disc 92 which is secured at its center of rotation to the output shaft 56 is a discal plate of magnetic material having 32 equally spaced teeth formed along its circumference, and the revolution detector 91 is mounted on the housing 18 at a position closely adjacent to the toothed disc 92 in the diametral direction of the latter. The revolution detector 91 is composed of a permanent magnet 101 and a coil 102 wound around the permanent magnet 101. The permanent magnet 101 and the coil 102 are housed in a suitable casing of non-magnetic material and the casing is mounted on the housing 18 of the transmission unit so that one end of the permanent magnet 101 is disposed in close proximity to the outer periphery of the toothed disc 92. As the tooth portion of the toothed disc 92 passes through the magnetic field of the permanent magnet 101 as a result of rotation of the toothed disc 92, a variation takes place in the leakage flux of the permanent magnet 101 so that an electromotive force is produced in the coil 102. In the case of the illustrated example, one complete rotation of the toothed disc 92 produces 32 voltage pulses. As previously described, a voltage signal at an A.C. voltage $S_3$ having a frequency $n_3 \times N_3$ is generally obtained when the toothed disc 92 having $n_3$ teeth rotates at a number of revolutions $N_3$ per unit time. The voltage signal appears across output terminals 103.

The outer peripheral shape of the toothed disc 72 in the means 70 for detecting the number of revolutions of the shaft 11 of the torque converter pump 12 and of the toothed disc 82 in the means 80 for detecting the number of revolutions of the shaft 14 of the torque converter turbine 13 is similar to that of the toothed disc 92, but the former are mounted relative to the torque converter turbine and the clutch drum in a manner different from the manner of mounting the latter. Output signal voltages $S_1$, $S_2$ and $S_3$ from the three revolution detecting means 70, 80 and 90 are led to leads 311, 321 and 331 in FIG. 7, respectively.

HYDRAULIC ACTUATING SYSTEM

In the case of the two-forward speed automatic transmission system, the hydraulic actuating system has a structure as shown in FIGS. 2, 3, 4 and 5. Briefly, the hydraulic actuating system comprises a hydraulic pressure source 250 and a hydraulic actuating circuit 230. The hydraulic actuating circuit 230 includes a gear position setting valve 260, a distributing valve 270, a solenoid 280, check valves 291 and 295, and hydraulic fluid or oil passages. The hydraulic pressure source 250 includes the hydraulic pump 17, an oil filter 259, an oil pan 258, a pressure regulating valve 256, a pressure control valve 252, a relief valve 253, an oil cooler 254, and hydraulic fluid or oil passages. The hydraulic pressure source 250 functions to supply oil under pressure to the torque converter 10, to the gear train 50 for lubricating same and to the hydraulic actuating circuit 230. (No description will be given herein as to the operation of the hydraulic pressure source 250 as it is well known in the art.) The speed changing region setting valve 260 includes a valve spool 262 and a valve casing 261. The valve spool 262 is adapted for interlocking operations with a control lever (not shown) disposed adjacent to the driver's seat so that it takes a corresponding position in response to urging of the control lever to one of the P (parking), R (reverse), N (neutral), D (drive) and L (low gear) positions. Symbols P, R, N, D and L shown in FIG. 2 represent the corresponding positions of the valve spool 262 which is moved in relation therewith. A groove 263 formed near the left-hand end of the valve spool 262 is adapted to receive therein a link connected to the control lever.

Figure 3:
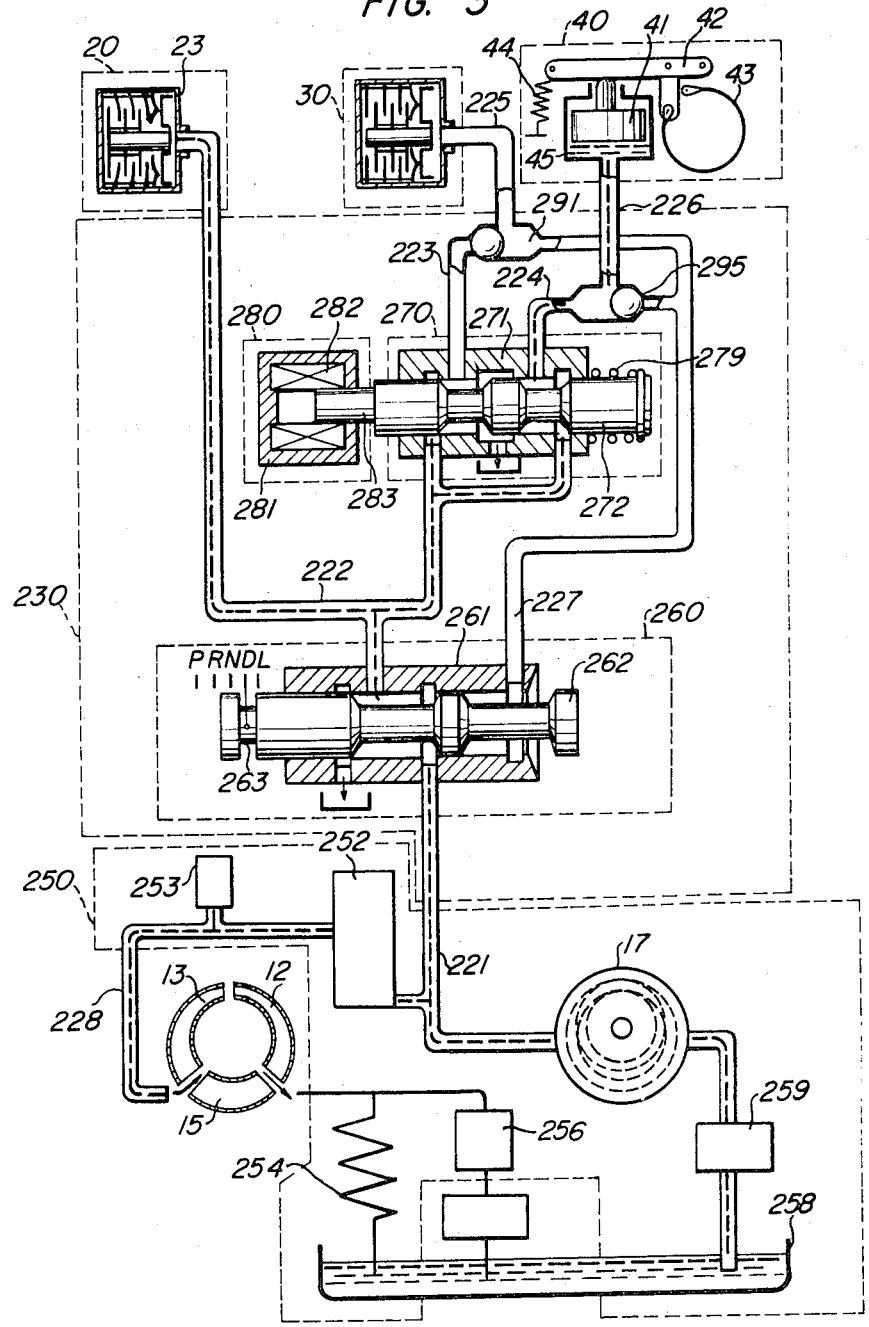
Figure 4:
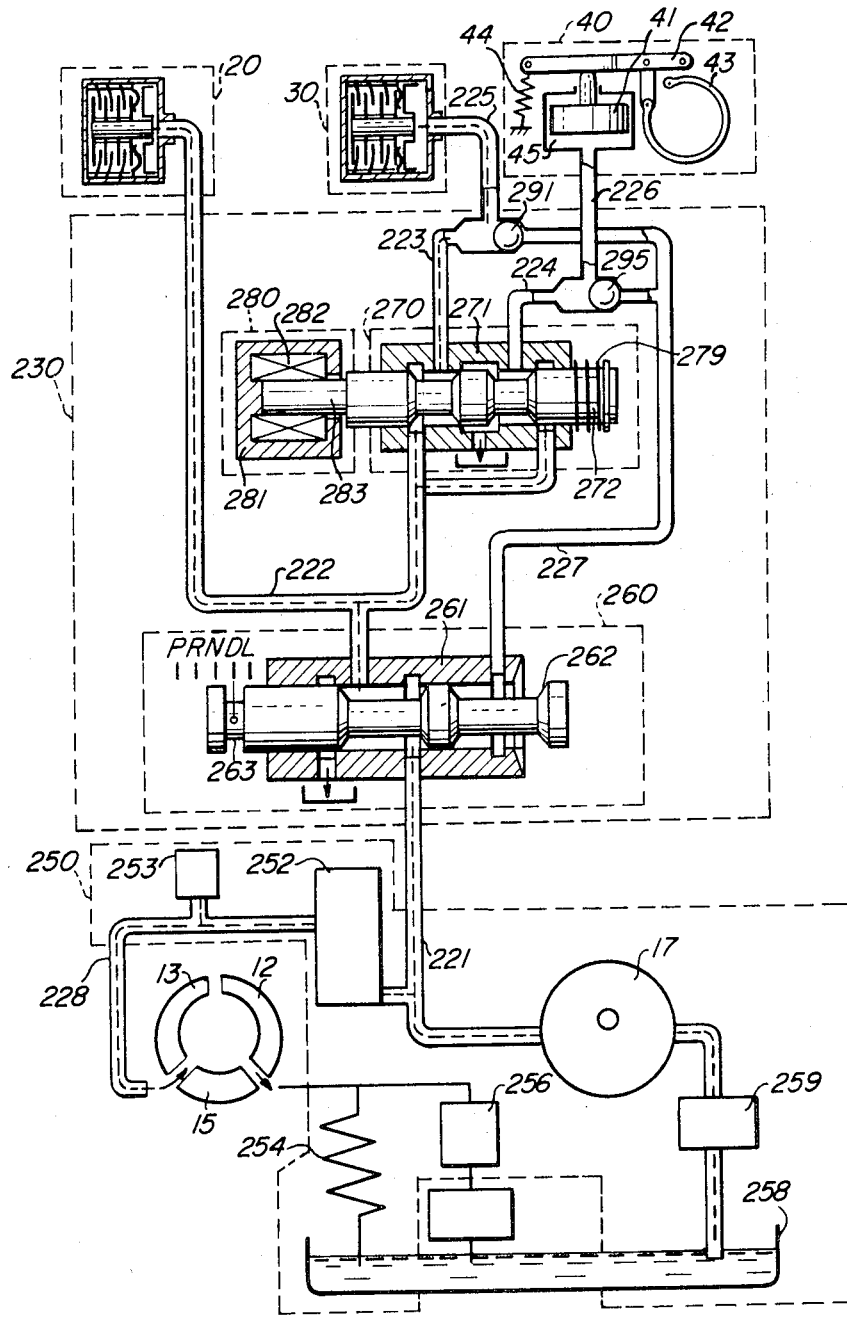
Figure 5:
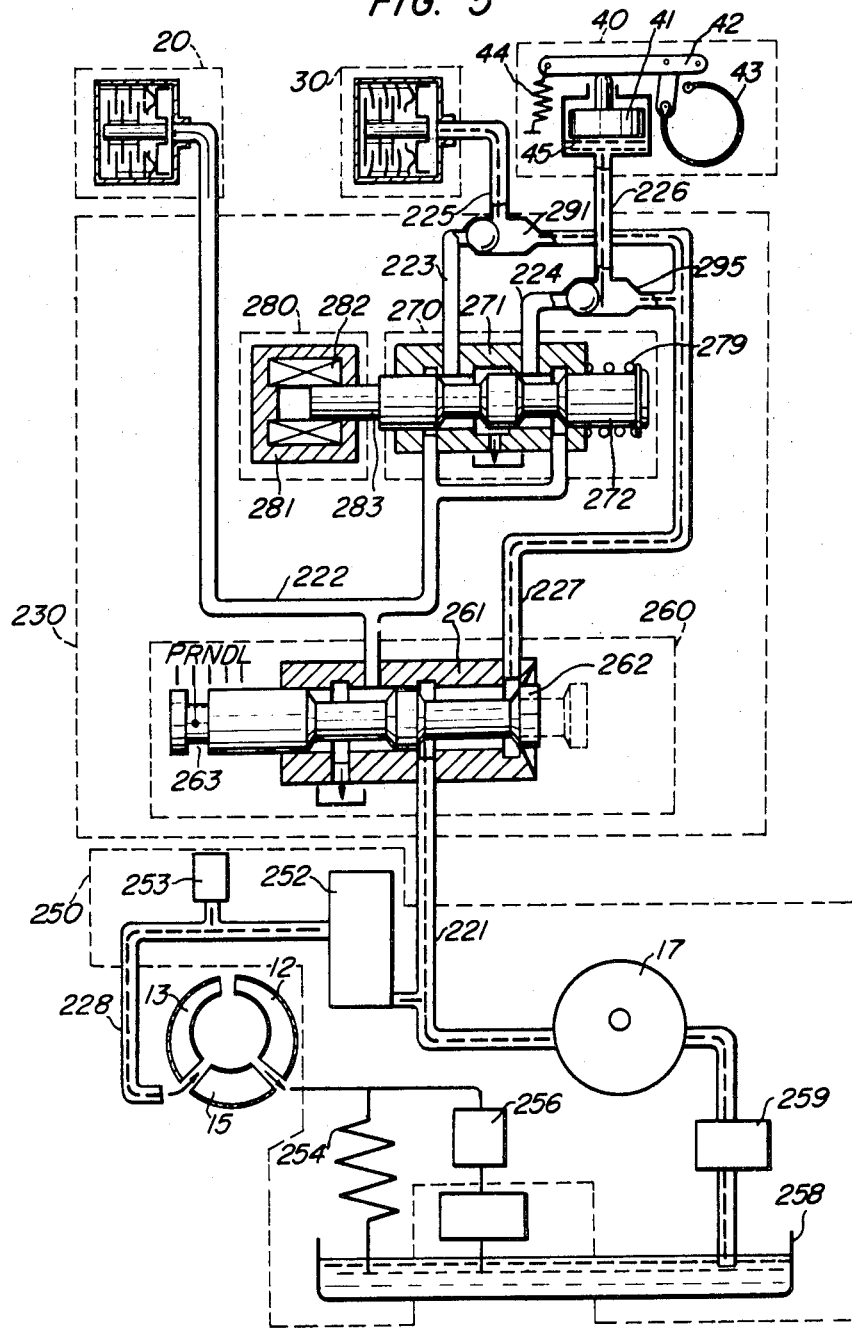

Suppose now that the gear position setting valve 260 is in its N position, then as seen in FIG. 2, an oil passage 221 is closed and oil passages 222 and 227 are opened. When the gear position setting valve 260 is urged to its L position, the oil passage 221 communicates with the oil passage 222 and the oil passage 227 is open as in the DL state of the D position shown in FIG. 3. However, an arrangement is made so that the solenoid 280 is in no way energized at the L position. When the gear position setting valve 260 is urged to its D state or more precisely the DL position, the oil passage 221 communicates with the oil passage 222 and the oil passage 227 is opened as seen in FIG. 3. Then when the solenoid 280 is energized in a manner as will be described later, the DH state shown in FIG. 4 is brought forth. When the gear position setting valve 260 is urged to its R position, the oil passage 221 communicates with the oil passage 227 and the oil passage 222 is opened as seen in FIG. 5. At the P position of the gear position setting valve 260, oil pressure communication from the passage 221 to the passages 222 and 227 is closed.

The distributing valve 270 includes a valve casing 271 and a valve spool 272. One end or left-hand end of the valve spool 272 is connected to a moving core 283 of the solenoid 280. When no current is supplied to the solenoid 280, the valve spool 272 is urged to its rightward position by the action of a spring 279 engaging the other or right-hand end of the valve spool 272 so that the oil passage 222 communicates with an oil passage 224 and an oil passage 223 is opened as seen in FIG. 3. In response to energization of the solenoid 280, the valve spool 272 is urged leftward so that the oil passage 222 communicates with the oil passage 223 and the oil passage 224 is opened as seen in FIG. 4. When thus the actuating hydraulic pressure is supplied to the oil passage 223, the check valve 291 establishes communication between oil passages 223 and 225 and blocks the oil passage 227 as seen in FIG. 4. On the contrary, when the actuating hydraulic pressure is supplied to the oil passage 227, the check valve 291 establishes communication between the oil passages 227 and 225 and blocks the oil passage 223 as seen in FIG. 5. In response to the supply of the actuating hydraulic pressure to the oil passage 224, the check valve 295 establishes communication between oil passages 224 and 226 and blocks the oil passage 227 as seen in FIG. 3. On the other hand, in response to the supply of the actuating hydraulic pressure to the oil passage 227, the check valve 295 establishes communication between the oil passages 227 and 226 and blocks the oil passage 224 as seen in FIG. 5.

In the solenoid 280, the moving core 283 is attracted to move to the left while simultaneously moving the valve spool 272 of the distributing valve 270 in that direction as seen in FIG. 4 when current is supplied to a coil 282. The moving core 283 is restored to its rightward position by the force of the spring 279 when the current supply is cut off as seen in FIG. 3. While the solenoid 280 is shown as a preferred electrical actuator in the illustrated embodiment, any other electrical actuator which converts an electrical signal into a mechanical displacement may be employed without departing from the spirit of the present invention.

The gear train 50 is placed in one of the N, D, L, R and P states by the action of the hydraulic elements described above. The detail of the operation will be described hereunder.

1. N state

As shown in FIG. 2, the actuating hydraulic pressure is interrupted by the gear position setting valve 260 and all the actuators including the front clutch 20, rear clutch 30 and rear brake 40 are in their released position and are not in operation. Therefore, the shaft 14 of the torque converter turbine 13 can freely rotate. That is, the vehicle is at rest. In FIG. 2, those oil passages illustrated with thick broken lines are applied with the actuating hydraulic pressure.

2. D state

The D state involves two states, that is, the DL state and the DH state. More precisely, the DL state indicates the state of low gear in the D state, while the DH state indicates the state of high gear in the D state.

In the DL state, the valve spool 272 of the distributing valve 270 takes its rightward position and the valve spool 262 of the gear position setting valve 260 is in its D position as seen in FIG. 3. The actuating hydraulic pressure is supplied to the oil passages 221, 222, 224 and 226 so as to apply pressure to the front clutch 20 and rear brake 40, and the rear clutch 30 is released to put the gear train 50 in low gear.

In the DH state, the valve spool 262 of the gear position setting valve 260 is in its D position and the valve spool 272 of the distributing valve 270 takes its leftward position (due to the current supplied to the solenoid 280) as seen in FIG. 4. The actuating hydraulic pressure is supplied to the oil passages 221, 222, 223 and 225 so as to apply pressure to the front clutch 20 and rear clutch 30, and the rear brake 40 is released to put the gear train 50 in high gear.

3. L state

In the L state, the valve spool 262 of the gear position setting valve 260 is placed in its L position and the valve spool 272 of the distributing valve 270 takes its rightward position. The actuating hydraulic pressure is supplied to the same oil passages as those in FIG. 3 so as to apply pressure to the front clutch 20 and rear brake 40, and the rear clutch 30 is released to put the gear train 50 in low gear.

4. R state

As seen in FIG. 5, the valve spool 262 of the gear position setting valve 260 is placed in its R position and the valve spool 272 of the distributing valve 270 takes its rightward position. The actuating hydraulic pressure is supplied to the rear clutch 30 and rear brake 40 by way of the oil passages 221, 227, 225 and 226, and the front clutch 20 is released to set up the R state.

5. P state

In the P state, the valve spool 262 of the gear position setting valve 260 is placed in its P position and the valve spool 272 of the distributing valve 270 takes its rightward position. As in the case of the N state shown in FIG. 2, the actuating hydraulic pressure is interrupted by the valve spool 262 of the gear position setting valve 260 with the result that all the actuators are in their released position. Although not shown, a parking device which operates in response to the P position of the gear position setting valve 260 acts to mechanically fix the output shaft 56 against any rotation as is commonly known in the art.

The speed change between DH and DL in the D state is automatically effected by energization or de-energization of the solenoid 280. The region of speed change for energizing or de-energizing the solenoid 280 at this speed changing point will next be described.

SPEED CHANGE DIAGRAM

In the present invention, the operating state of the engine is given by the number of revolutions $N_1$ of the shaft 11 of the torque converter pump 12, the operating state of the torque converter 10 is given by the slip ratio, and the running state of the vehicle is given by the number of revolutions $N_3$ of the output shaft 56 as previously described. Thus, the speed changing point required for the vehicle is determined from the magnitudes of these factors. When the vehicle runs on a level road or in an urban area or when the vehicle is lightly loaded, the engine is not required to develop an extremely high output and thus it is desirable in respect of noises and fuel costs to change speed at a relatively small number of revolutions of the engine. On the contrary, when the vehicle runs on a sloping road or in a suburban area or when the vehicle is heavily loaded, it is desirable to change speed under full engine power.

Figure 6A:
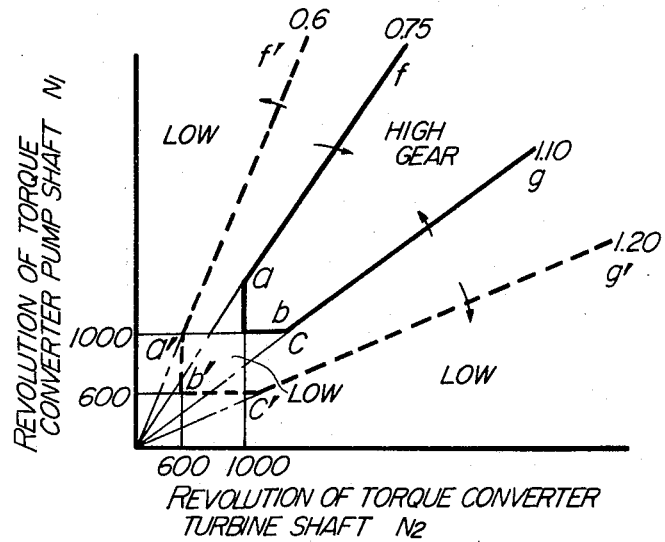
FIGS. 6a and 6b are graphs showing two forms of the speed changing region before and after the speed changing points are varied, respectively.

FIG. 6a illustrates the speed changing points in the case of a light load. The speed changing points from low to high gear are shown by the solid lines $bc$, $ab$, $af$ and $cg$. The line $bc$ represents the number of revolutions $N_1 = 1,000$ rpm of the shaft 11 of the torque converter pump 12. The line $ab$ represents the number of revolutions $N_2 = 1,000$ rpm of the shaft 14 of the torque converter turbine 13. (Here, the number of revolutions $N_3$ of the output shaft 56 is expressed in terms of $N_2$ which is the number of revolutions of the shaft 14 of the torque converter turbine 13.) The lines $af$ and $cg$ represents the slip ratios 0.75 and 1.10, respectively, of the torque converter 10. (As is commonly known, the slip ratio is obtained by dividing the number of revolutions $N_2$ of the shaft 14 of the torque converter turbine 13 by the number of revolutions $N_1$ of the shaft 11 of the torque converter pump 12.) When the conditions of the torque converter 10 are shifted to a region surrounded by these lines, the speed is changed from low to high gear. After the speed has thus been changed, the high gear position is maintained unless the conditions of the torque converter 10 are shifted to cross any one of speed changing lines shown by the broken lines $b'c'$, $a'b'$, $a'f'$ and $c'g'$. These lines are speed changing points from high to low gear. The broken line $b'c'$ represents the number of revolutions $N_1 = 600$ rpm of the shaft 11 of the torque converter pump 12. The broken line $a'b'$ represents the number of revolutions $N_2 = 600$ rpm of the shaft 14 of the torque converter turbine 13. The broken lines $a'f'$ and $c'g'$ represent the slip ratios $(N_2/N_1) = 0.60$ and $(N_2/N_1) = 1.20$, respectively, of the torque converter 10. The speed is changed from high to low gear when the conditions of the torque converter 10 make a shift from a region surrounded by these broken lines.

Figure 6B:
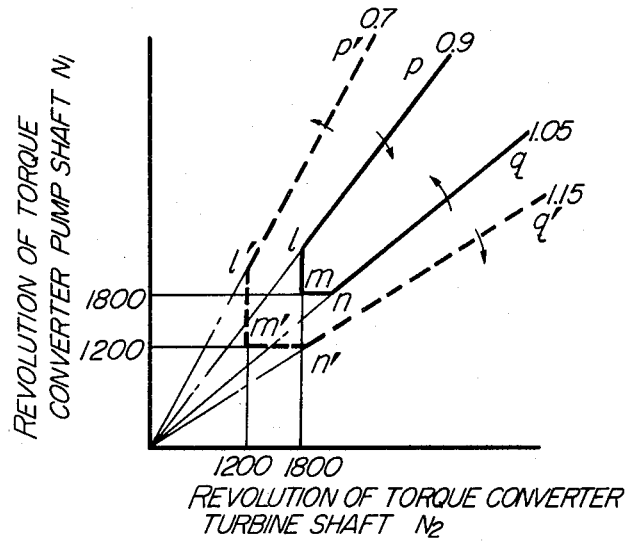

FIG. 6b illustrates speed changing points in the case of a heavy load. The speed changing points from low to high gear are shown by the solid lines $mn$, $lm$, $lp$ and $nq$. The line $mn$ represents the number of revolutions $N_1 = 1,800$ rpm of the shaft 11 of the torque converter pump 12. The line $lm$ represents the number of revolutions $N_2 = 1,800$ rpm of the shaft 14 of the torque converter turbine 13. (Here, the number of revolutions $N_3$ of the output shaft 56 is expressed in terms of $N_2$ which is the number of revolutions of the shaft 14 of the torque converter turbine 13.) The lines $lp$ and $nq$ represent the slip ratios $(N_2/N_1) = 0.9$ and $(N_2/N_1) = 1.05$, respectively, of the torque converter 10. The speed is changed from low to high gear when the conditions of the torque converter 10 are shifted to a region surrounded by these solid lines. Speed changing points from high to low gear are shown by the broken lines $m'n'$, $l'm'$, $l'p'$ and $n'q'$. The broken line $m'n'$ represents the number of revolutions $N_1 = 1,200$ rpm of the shaft 11 of the torque converter pump 12. The broken line $l'm'$ represents the number of revolutions $N_2 = 1,200$ rpm of the shaft 14 of the torque converter turbine 13. The broken lines $l'p'$ and $n'q'$ represent the slip ratios $(N_2/N_1) = 0.7$ and $N_2/N_1 = 1.15$, respectively, of the torque converter 10. The speed is changed from high to low gear when the conditions of the torque converter 10 makes a shift from a region surrounded by these broken lines.

The values specified above are merely shown by way of example and it will be understood that the most desirable values need be chosen depending on the performance of the internal combustion engine, the torque converter transmission unit and the vehicle. It is considered, however, that in some cases, all the speed changing points (lines) including the number of revolutions $N_1$ of the shaft 11 of the torque converter pump 12, the number of revolutions $N_2$ of the shaft 14 of the torque converter turbine 13 and the slip ratio $N_2/N_1$ of the torque converter 10 may not be required.

While the speed changing points (lines) are shown by the straight lines, the present invention also includes the case in which they are given by curves. Further, although the speed changing points (lines) are defined by the number of revolutions $N_1$ of the shaft 11 of the torque converter pump 12, the number of revolutions $N_2$ of the shaft 14 of the torque converter turbine 13, and the slip ratio $N_2/N_1$ which is the ratio of the latter to the former, the speed changing points may be defined by the number of revolutions of the engine and the negative pressure in the air intake pipe. This is also included in the scope of the present invention.

CONTROL DEVICE

FIG. 7 shows the structure of an electrical control device for controlling the speed changing operation according to the speed change diagrams shown in FIGS. 6a and 6b. The electrical control device includes a circuit 310 for generating an output voltage proportional to the rotating speed or number of revolutions $N_1$ of the shaft 11 of the torque converter pump 12, a circuit 320 for generating an output voltage proportional to the rotating speed or number of revolutions $N_2$ of the shaft 14 of the torque converter turbine 13, a circuit 330 for generating an output voltage proportional to the rotating speed or number of revolutions $N_3$ of the output shaft 56, four slip operating circuits 410, 420, 430 and 440, four revolution setting operating circuits 340, 350, 360 and 370, two AND circuits 510 and 520, an OR circuit 530, a bistable memory circuit 540, a synchronous timing holding circuit 560, two NOT circuits 570 and 610, two gear position circuits 580 and 590, and switch means 433. The electrical control device is placed in a state capable of making control operations as it is connected to a power source by a switch (not shown) when the control lever is set at its D position.

In FIG. 7, a voltage output $S_1$ from the means 70 for detecting the number of revolutions $N_1$ of the shaft 11 of the torque converter pump 12 is applied by way of the lead 311 to the torque converter pump shaft revolution operating circuit 310. An electrical signal $[N_1]$ representing the number of revolutions $N_1$ of the shaft 11 of the torque converter pump 12 is delivered from the circuit 310 by way of a lead 312. (Hereinafter, square brackets are affixed to an electrical signal representing the number of revolutions.) A voltage output $S_2$ from the means 80 for detecting the number of revolutions $N_2$ of the shaft 14 of the torque converter turbine 13 is applied by way of the lead 321 to the torque converter turbine shaft revolution operating circuit 320. An electrical signal $[N_2]$ representing the number of revolutions $N_2$ of the shaft 14 of the torque converter turbine 13 is delivered from the circuit 320 by way of a lead 322. A voltage output $S_3$ from the means 90 for detecting the number of revolutions $N_3$ of the output shaft 56 is applied by way of the lead 331 to the output shaft revolution operating circuit 330. An electrical signal $[N_3]$ representing the number of revolutions $N_3$ of the output shaft 56 is delivered from the circuit 330 by way of a lead 332.

The electrical signal $[N_1]$ is applied through the lead 312 to the revolution setting operating circuit 340, and an electrical signal representing $[N_1] > 1,800$ rpm or $[N_1] > 1,000$ rpm is delivered from the circuit 340 by way of a lead 342. The two settings $[N_1] > 1,800$ rpm and $[N_1] > 1,000$ rpm of the revolution setting operating circuit 340 can be changed from one to another by operating the switch means 433. Similarly, the electrical signal $[N_1]$ is applied through the lead 312 to the revolution setting operating circuit 350. The electrical signal $[N_3]$ is applied through the lead 332 to the revolution setting operating circuits 360 and 370. Electrical signals representing $[N_1] < 1,200$ rpm or $[N_1] < 600$ rpm, $(N_2) > 1,800$ rpm or $(N_2) > 1,000$ rpm, and $(N_2) < 1,200$ rpm or $(N_2) < 600$ rpm are delivered from the circuits 350, 360 and 370 by way of leads 352, 362 and 372, respectively. Here, $[N_2]$ indicates a value obtained by expressing $[N_3]$ in terms of the number of revolutions of the shaft 14 of the torque converter turbine 13.

The two signals $[N_1]$ and $[N_2]$ are applied to the slip operating circuit 410 through the leads 312 and 322, respectively. An output voltage signal representing the result of operation of $[N_2/N_1] > 0.90$ or $[N_2/N_1] > 0.75$ is delivered from the circuit 410 by way of a lead 412. The two settings $[N_2/N_1] > 0.90$ and $[N_2/N_1] > 0.75$ of the slip operating circuit 410 can be switched over to each other by the switch means 433. Similarly, the two voltage signals $[N_1]$ and $[N_2]$ are applied to the slip operating circuits 420, 430 and 440 through the leads 312 and 322. Output voltage signals representing the result of operation of $[N_2/N_1] < 0.70$ or $[N_2/N_1] < 0.60$, $[N_2/N_1] > 1.20$ or $[N_2/N_1] > 1.15$, and $[N_2/N_1] < 1.10$ or $[N_2/N_1] < 1.05$ are delivered from the circuits 420, 430 and 440 by way of leads 422, 432 and 442, respectively.

Output signals from the revolution setting operating circuit 340, slip operating circuit 410, slip operating circuit 440, revolution setting operating circuit 360, low gear position circuit 590 and NOT circuit B 570 are applied to the AND circuit A 510 by way of leads 342, 412, 442, 362, 592 and 572, respectively. An output voltage signal representing the result of this logical operation is delivered from the AND circuit A 510 by way of a lead 512.

Input signals to the AND circuit B 520 are applied through leads 532, 542 and 572, and an output voltage signal is delivered from the AND circuit B 520 by way of a lead 522.

Input voltage signals to the OR circuit 530 are applied through leads 352, 422, 432 and 372, and an output voltage signal is delivered from the OR circuit 530 by way of the lead 532.

Input voltage signals to the bistable memory circuit 540 are applied through the leads 512 and 522, and an output voltage signal is delivered from the circuit 540 by way of the lead 542.

An input voltage signal is applied to the synchronous timing holding circuit 560 through the lead 542, and an output voltage signal is delivered from the circuit 560 by way of a lead 562.

An input voltage signal is applied to the NOT circuit A 610 through the lead 542, and an output voltage signal is delivered from the circuit 610 by way of a lead 612.

An input voltage signal to the NOT circuit B 570 is applied through the lead 562, and an output voltage signal is delivered from the circuit 570 by way of the lead 572. An input voltage signal is applied to the high gear position circuit 580 through the lead 542. An input voltage signal is applied to the low gear position circuit 590 through the lead 612, and an output voltage signal is delivered from the circuit 590 by way of the lead 592. The lead 542 is connected to the solenoid 280 so that the output signal from the bistable memory circuit 540 can be supplied to the solenoid 280 by the lead 542. A lead 444 connects the switch means 433 to switch-over terminals of the revolution setting operating circuits 340, 350, 360 and 370 and to switch-over terminals of the slip operating circuits 410, 420, 430 and 440.

1. Revolution operating circuits

Figure 9:
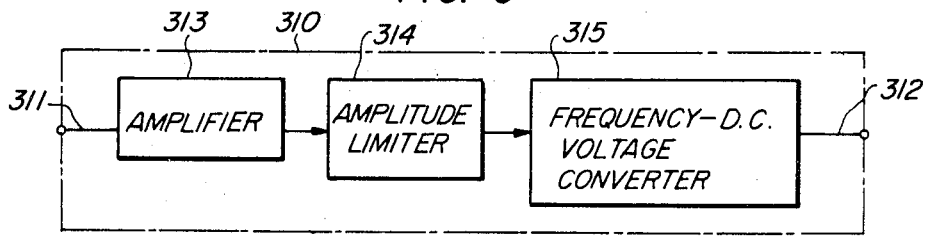
FIG. 9 is a block diagram showing the structure of a revolution operating circuit in the device shown in FIG. 7.
Figure 10A:
FIGS. 10a to 10c are graphic illustrations of the operating voltage waveforms in the revolution operating circuit shown in FIG. 9.
Figure 10B:
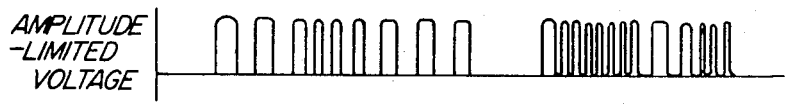
Figure 10C:
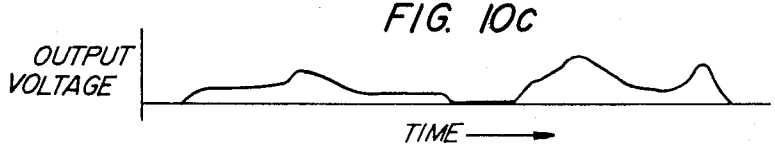

The torque converter pump shaft revolution operating circuit 310, torque converter turbine shaft revolution operating circuit 320 and output shaft revolution operating circuit 330 compute the respective numbers of revolutions when supplied with the voltage signals $S_1$, $S_2$ and $S_3$ described above. The circuits are similar in their structure. For instance, the torque converter pump shaft revolution operating circuit 310 has a structure as shown in FIG. 9. The input voltage signal $S_1$ is applied to the circuit 310 by the lead 311. In the circuit 310, an amplifying circuit 313 amplifies the signal, an amplitude limiting circuit 314 limits the amplitude of the signal to a fixed value, and a frequency-D.C. voltage conversion circuit 315 (which is for example a frequency detecting and rectifying circuit) converts the A.C. voltage into a D.C. voltage which is then led out through the lead 1). FIG. 10a shows the voltage waveform of the signal $S_1$, and the same waveform remains after the signal $S_i$ is amplified. FIG. 10b shows the waveform of the output from the amplitude limiting circuit 314. FIG. 10c shows the waveform of the output from the frequency-D.C. voltage conversion circuit 315, that is, the waveform of the output $[N_1]$ from the revolution operating circuit 310. It will thus be seen that an arithmetic operation of $N_1 = (S_1/n_1$ is carried out in the circuit 310. The constants of a time constant circuit consisting of a resistor and a capacitor disposed in the frequency detecting circuit portion of the frequency-D.C. voltage conversion circuit 315, may suitably be varied so that the torque converter turbine shaft revolution operating circuit 320 and output shaft revolution operating circuit 330 can effect the respective computations of $N_2 = (S_2/n_2)$ and $N_3 = (S_3/n_3)$.

2. Slip operating circuits

Figure 11A:
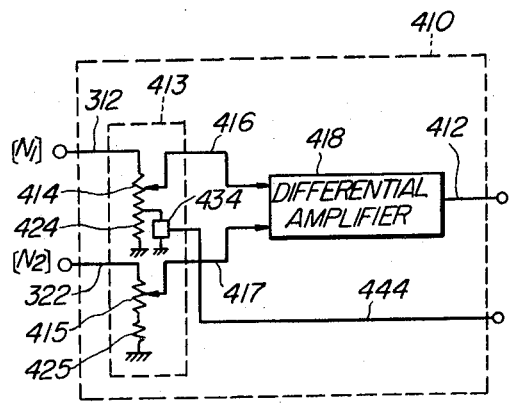
FIGS. 11a and 11b are a block diagram and a circuit diagram, respectively, showing the structure of a slip operating circuit included in the device shown in FIG. 7 and having a variable setting.

The output voltage signals $[N_1]$ and $[N_2]$ from the respective revolution operating circuits 310 and 320 are applied by the respective leads 312 and 322 to the four slip operating circuits 410, 420, 430 and 440 all of which have a similar structure. For instance, the slip operating circuit 410 has a structure as shown in FIG. 11a. The leads 312 and 322 are connected to one end of respective potentiometers 414 and 415. The other end of the potentiometers 414 and 415 is grounded. Slide arms 416 and 417 of the respective potentiometers 414 and 415 are connected to a differential amplifying circuit 418 whose output signal appears on the lead 412.

Figure 11B:
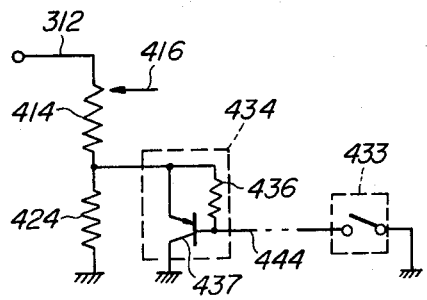

A switching circuit 434 is connected in parallel with a portion 424 of the resistor of the potentiometer 414, and a lead 444 is connected to the switching circuit 434 so that the switching circuit 434 can carry out the desired switching operation. As shown in FIG. 11b, the switching circuit 434 comprises a transistor 437 and a resistor 436. When the switch means 433 is manually closed, the transistor 437 conducts and the resistor portion 424 of the potentiometer 414 is short-circuited to ground. When, on the other hand, the switch means 433 is manually urged to its open position, the transistor 437 is cut off to provide a resistance which is very high compared with that of the resistor 424. In this situation, the potentiometer 414 is grounded through the resistor 424 as a matter of course.

While FIG. 11a illustrates an arrangement in which a single switching circuit 343 is coupled to the potentiometer 414, it is in no way intended to limit the number thereof to one and two switching circuits may be associated with the potentiometers 414 and 415 so as to short-circuit a portion of the potentiometers to ground and disconnect such a portion from ground.

The operation of the slip ratio $[N_2/N_1] > 0.90$ will be described by way of example. $[N_2/N_1] > 0.90$ is equal to $[N_2] > 0.90 [N_1]$, hence $[N_2] 0.90 [N_1] > 0$. For the computation of $[N_2] - 0.90 [N_1] > 0$, the switch means 433 is kept in its open position and the potentiometer 414 and FIG. 11a is so set that an output voltage of 0.90 $[N_1]$ appears at the slide arm 416 in response to the supply of the signal $[N_1]$ to the potentiometer 414 through the lead 312. The potentiometer 415 is so set that an output voltage equal to $[N_2]$ appears at the slide arm 417 in response to the supply of the signal $[N_2]$ through the lead 322. That is, the slide arm 417 is directly connected to the lead 322. When these two voltages are supplied to the differential amplifier 418, the difference therebetween, that is, $[N_2] - 0.90 [N_1]$ is computed. When the result is positive, the difference is amplified to appear as a fixed voltage on the lead 412, while when the result is negative, no output voltage appears on the lead 412. Thus, the appearance of a voltage indicates that $[N_2] - 0.90 [N_1] > 0$, hence $[N_2/N_1] > 0.90 = 9/10$.

On the other hand, the computation of the slip ratio $[N_2/N_1] > 0.75 = 3/4$ means that the computation of $[N_2] - 0.75 [N_1] > 0$ is carried out. However, the potentiometers 414 and 415 have been so set that the signals 0.90 $[N_1]$ and $[N_2]$ appear at the respective slide arms 416 and 417. Accordingly, in order to realize the above arithmetic operation, the previous arrangement for computing $[N_2]$ 9/10 $[N_1] > 0$ must suitably be modified so that $[N_2] - 3/4[N_1] > 0$ can be computed. This is attained by deriving an output $$\frac{3}{4}[N_1] = \frac{9-6}{10-6}[N_1]$$

from the slide arm 416. That is, assuming that the total resistance value of the resistors 414 and 424 is 10 and the resistor 424 has a resistance value of 6 which is 60 percent of the total resistance value, the signal of (9/10) $[N_1]$ can be changed to the signal of 3/4$[N_1]$ by short-circuiting the resistor 424 by the switch means 434.

No output voltage appears on the lead 412 when $[N_2/N_1] < 0.90$. When, for example, $[N_2/N_1] < 0.90$ is required, such operation can be effected by applying $[N_2]$ to the lead 312, directly connecting the slide arm 416 to the lead 312, applying $[N_1]$ to the lead 322, and suitably setting the slide arm 417 so as to obtain a signal voltage of 0.90 $[N_1]$.

Similarly, conversion of the slip operating circuit 430 so that it can compute $[N_2/N_1] > 1.20$ instead of $[N_2/N_1] > 1.15$ can be attained by setting the slide arms 417 and 416 at a position at which a signal of (1/1.20) $[N_2]$ and $[N_1]$ can be obtained respectively, disposing the switching circuit 434 in parallel with a portion 424 of the potentiometer 414, and closing the switch means 433 to short-circuit the portion 424 of the potentiometer 414.

In this manner, the setting of the desired slip ratio and the switch-over of the slip ratios can be effected by setting the slide arm of one of the potentiometers at a suitable position and urging the transistor in the switching circuit to its conducting state thereby to short-circuit a portion of the resistor of the potentiometer. Further, the arithmetic operation of the slip ratio in either case in which it is larger or smaller than a predetermined setting can be carried out by suitably selecting the input terminals of the potentiometers. That is to say, the conversion from $[N_2/N_1] > 0.90$ to $[N_2/N_1] > 0.75$, from $[N_2/N_1] < 0.70$ to $[N_2/N_1] < 0.60$, from $[N_2/N_1] > 1.20$ to $[N_2/N_1] > 1.15$, and from $[N_2/N_1] < 1.05$ to $[N_2/N_1] < 1.10$ can be effected by closing the switch means 433.

3. Revolution setting operating circuits

Figure 12:
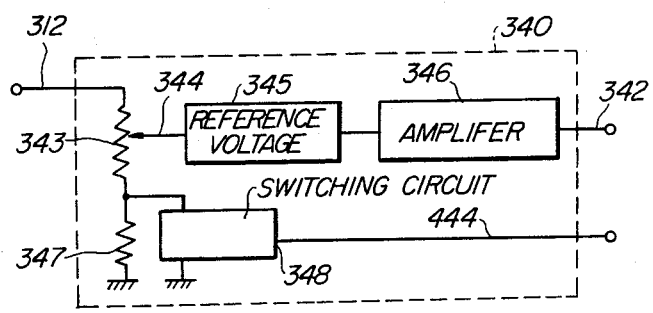
FIG. 12 is a block diagram showing the structure of a revolution setting operating circuit included in the device shown in FIG. 7 and having a variable setting.

There are four revolution setting operating circuits 340, 350, 360 and 370. These circuits are operative in determining whether an output signal is to be delivered or not depending on the magnitude of the input voltages $[N_1]$ and $[N_3]$ relative to predetermined values. These circuits include a circuit which converts a predetermined setting into another setting. These four circuits are similar in their structure. By way of example, the structure of the revolution setting operating circuit 340 having two convertible settings $[N_1] > 1,800$ rpm and $[N_1] > 1,000$ will be described with reference to FIG. 12.

The input voltage $[N_1]$ representing the number of revolutions $[N_1]$ is applied through the lead 312 to a potentiometer 343. A slide arm 344 is connected to a reference voltage means 345 such as a Zener diode which conducts at a voltage higher than a reference voltage. The reference voltage means 345 is connected to an amplifying circuit 346 whose output appears on the lead 342. The slide arm 344 is set at a suitable position so as to suitably divide the voltage $[N_1]$ led to the potentiometer 343. When the voltage at the slide arm 344 is higher than the reference voltage at the reference voltage means 345, the latter sends out a signal to the amplifying circuit 346 which amplifies the signal and delivers such a voltage to the lead 342. When, conversely, the reference voltage at the reference voltage means 345 is higher than the voltage at the slide arm 344, no voltage appears at the output. Suppose, for example, that an output voltage signal can be delivered to the lead 342 at $[N_1] > 600$ rpm when the slide arm 344 of the potentiometer 343 is set at a position at which it is directly connected with the lead 312. In such a case, the setting of $[N_1] > 1,000$ rpm can be obtained by sliding the slide arm 344 to a position corresponding to 600/1,000 or 3/5 of the whole length of the potentiometer 343 as measured from the grounded end. By this arrangement, an output voltage signal can be derived from the lead 342 only when $[N_1]$ is higher than 1,000 rpm. And a switching circuit 348 of a structure similar to that shown in FIG. 11b may be associated with the potentiometer 343 so as to short-circuiting the resistor a portion 347 of the resistor of the potentiometer 343 thereby to convert the setting of $[N_1] > 1,000$ rpm to a setting of, for example, $[N_1] > 1,800$ rpm. That is, the setting of $[N_1] > 1,800$ rpm can be obtained by short-circuiting the resistor portion 347 corresponding to $$\frac{(1,800-1,000) \times 600}{(1,800-600) \times 1,000} = \frac{2}{5}$$

of the whole length of the potentiometer 343 when the slide arm 344 is set at the position corresponding to $(600/1,000) = (3/5)$ of the whole length of the potentiometer 343. This is done by closing the switch means 433. The closure of the switch means 433 causes the short-circuit of the resistor portion 347 of the potentiometer 343, and the resistance between the slide arm 344 of the potentiometer 343 and ground amounts to $(600/1,800) = 1/3$ of the remaining resistance. Thus, the setting of $[N_1] > 1,000$ rpm can be converted to the setting of $[N_1]>1,800$ rpm. The amplifier circuit 346 may include a phase inverter circuit therein when the reference voltage at the reference voltage means 345 is higher than the voltage at the slide arm 344, the output voltage of the amplifier circuit 346 appears on the lead 342. Thus the setting of $[N_1]<1,800$ rpm is obtained. Similarly, the conversion of the setting from $[N_1]<600$ rpm to $[N_1]<1,200$ rpm, from $(N_2)>1,000$ rpm to $(N_2)>1,800$ rpm, and from $(N_2)<600$ rpm to $(N_2)<1,200$ rpm can be effected.

4. High gear position circuit, low gear position circuit and NOT circuit

In order to make a speed change, it is necessary to know whether the transmission is in low or high gear. A signal representing the supply of power to the solenoid 280 may be utilized to indicate the state of the transmission, viz., either high or low gear. Thus, the voltage applied to the solenoid 280 is taken as a signal of the high gear position 580. No output voltage is delivered from the NOT circuit A 610 (a phase inversion circuit in which no voltage appears at the output when a voltage is applied to the input) when the voltage is applied to the solenoid 280, while an output signal voltage is delivered from the NOT circuit when no voltage is applied to the solenoid 280. This output signal voltage is taken as a signal of the low gear position 590. In lieu of the position signals described above, an electrical signal may be derived from the hydraulic actuating circuit or from a part of the gear train without departing from the spirit of the present invention so long as such signal correctly transmits the shifted gear position.

5. Synchronous timing holding circuit

For some time after the power is supplied to the solenoid 280 or the power supply to the solenoid 280 is cut off, the hydraulic actuating circuit and the transmission unit are making speed changing operations, and the speed changing operations will not be completely carried out if another speed changing signal is applied during the above period of time. It is, therefore, necessary to hold the apparatus in the existing state so that the application of another speed changing signal may not actuate the apparatus until the speed changing operations are completely finished.

Figure 13:
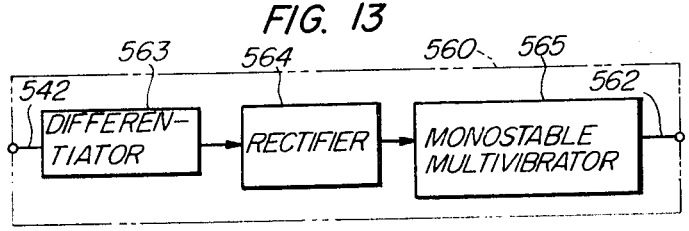
FIG. 13 is a block diagram showing the structure of a synchronous timing holding circuit in the device shown in FIG. 7.
Figure 14A:
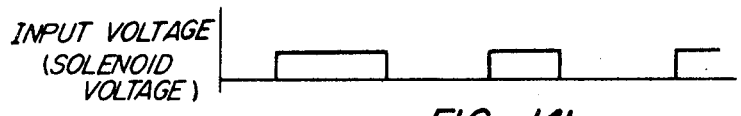
FIGS. 14a to 14d are graphic illustrations of the operating voltage waveforms in the synchronous timing holding circuit shown in FIG. 13.
Figure 14B:
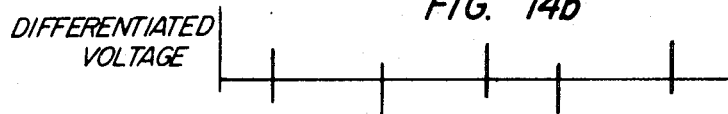
Figure 14C:
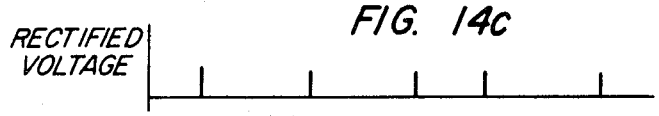
Figure 14D:
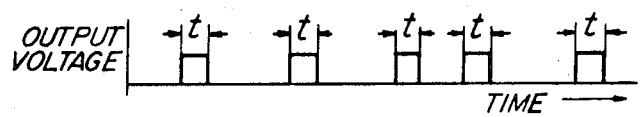

This is accomplished by a circuit as shown in FIG. 13. The synchronous timing holding circuit 560 comprises a differential circuit 563, a rectifying circuit 564, and a monostable multivibrator 565. A voltage of a waveform as shown in FIG. 14a applied to the solenoid 280 is led into the synchronous timing holding circuit 560 through the lead 542 and is differentiated by the differential circuit 563 in a manner as shown in FIG. 14b. The differentiated voltage signal is rectified by the rectifying circuit 564 in a manner as shown in FIG. 14c. This signal is used to trigger the monostable multivibrator 565 which delivers therefore a pulse output signal whose pulse duration is $t$ as shown in FIG. 14d. This output signal appears on the lead 562.

For the sake of synchronous timing holding, an electrical signal representing the fact that the transmission unit has completed the shifting of the gear position after the supply of power to the solenoid 280 or the cut-off of power supply to the solenoid 280 may be derived electrical mechanically from a suitable portion of the hydraulic actuating circuit or transmission unit. Such a method is also included in the scope of the present invention.

6. AND circuits 6.1. AND circuit A 510

The AND circuit A 510 is a conventional AND circuit. Thus, an output voltage signal is delivered signal is delivered from the AND circuit A 510 to appear on the lead 512 when the signal of $[N_1]>1,000$ rpm or $[N_1]>1,800$ rpm from the revolution setting operating circuit 340, the signal of $[N_2/N_1]>0.75$ or $[N_2/N_1]>0.90$ from the slip operating circuit 410, the signal of $[N_2/N_1]<1.05$ or $[N_2/N_1]<1.10$ from the slip operating circuit 440, the signal of $(N_2)>1,000$ rpm or $(N_2)>1,800$ rpm from the revolution setting operating circuit 360, the signal from the low gear position circuit 590, and the signal from the NOT circuit B 570 exist simultaneously.

6.2. AND circuit B 520

The AND circuit or NAND circuit B 520 is also a conventional AND circuit. Thus, an output voltage signal is delivered from the AND circuit B 520 to appear on the lead 522 when the output signal from the OR circuit 530, the signal from the high gear position circuit 580, and the signal from the NOT circuit B 570 exist simultaneously.

7. OR circuit

Actually, the OR circuit 530 may be one which is called by the name of an OR circuit or a NOR circuit. Thus, when any one of the output signal from the revolution setting operating circuit 350, the output signal from the slip operating circuit 420, the output signal from the slip operating circuit 430, and the output signal from the revolution setting operating circuit 370 exists, an output voltage signal is delivered from the OR circuit 530 to appear on the lead 532.

8. Bistable memory circuit

Figure 15:
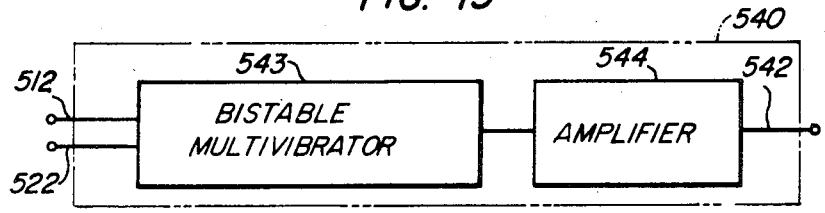
FIG. 15 is a block diagram of a bistable memory circuit in the device shown in FIG. 7.
Figure 16A:
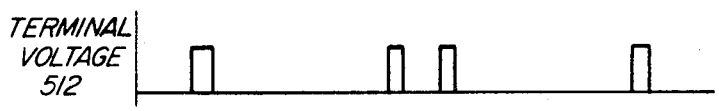
FIGS. 16a to 16c are graphic illustrations of the operating voltage waveforms in the bistable memory circuit shown in FIG. 15.

The bistable memory circuit 540 has a structure as shown in FIG. 15. The leads 512 and 522 are connected to the input terminals of a bistable multivibrator 543. When a positive voltage signal as shown in FIG. 16a is applied from the AND circuit A 510 to the bistable multivibrator 543 through the lead 512, the bistable multivibrator 543 is placed in one of the bistable states and its output is amplified by an amplifying circuit 544 to appear on the lead 542 to be supplied to the solenoid 280. The output voltage from the amplifying circuit 544 has a waveform as shown in FIG. 16c.

Figure 16B:
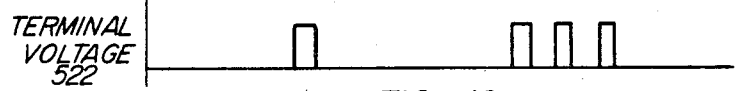
Figure 16C:
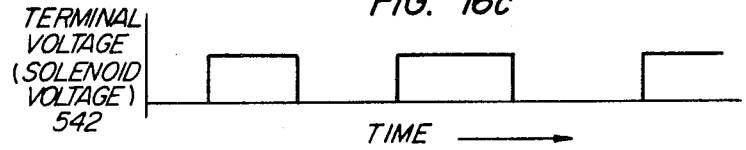

When an input voltage as shown in FIG. 16b is applied to the bistable multivibrator 543 through the lead 522, the bistable multivibrator 543 is placed in the other stable state and its output is amplified by the amplifier 544, but no output voltage will be delivered from the amplifier 544 as will be apparent from FIG. 16c. Even when the input voltage signal is applied to the bistable multivibrator 543 through the lead 512 and then disappears, the bistable multivibrator 543 remains in its stable state to continuously supply power to the solenoid 280 for the predetermined period of time. Re-application of the voltage through the lead 512 immediately after the application of the preceding voltage does not interrupt the energized state of the solenoid 280 as will be apparent from reference to the third pulse in FIG. 16a and the second pulse in FIG. 16c.

OPERATION OF ELECTRICAL CONTROL DEVICE

1. Logical operation for changing gear from low gear to high gear

In the case of gear change from low to high gear, arithmetic and logical operations are carried out when the speed changing conditions are shifted to within the speed changing region shown by the solid lines in FIG. 16a. The solenoid 280 is energized and the valve spool 272 of the distributing valve 270 is urged leftward to shift the hydraulic actuating circuit 230 from the state of FIG. 3 to the state of FIG. 4 with the result that the actuators shift the gear train 50 from low gear to high gear.

In FIGS. 17 through 22, those circuits in which voltage signals appear in the control device shown in FIG. 7 are connected by solid lines, while those circuits in which voltage signals do not appear are connected by broken lines. As seen in FIG. 17, the solenoid 280 is not energized until the speed is changed. Thus, the NOT circuit A 610 delivers a signal and hence, the low gear position circuit 590 delivers a signal. Further, due to the fact that the synchronous timing holding circuit 560 does not deliver any signal, the NOT circuit B 570 delivers an output signal. These signals are applied to the AND circuit A 510.

Under a light load, the condition $[N_1] > 1,000$ rpm holds as the revolutions of the engine are increased. At a still higher vehicle speed, the condition $(N_2) > 1,000$ rpm holds and the condition $[N_2/N_1] > 0.75$ representing the slip ratio of the torque converter is satisfied. (Of course, the condition $[N_2/N_1] < 1.10$ is also satisfied in this case.) When these conditions are satisfied, output signals are delivered from the respective operating circuits 340, 360, 410 and 440. At a heavy load, output signals are delivered from the respective operating circuits 340, 360, 410 and 440 when the condition $[N_1] > 1,8000$ rpm, the condition $(N_2) > 1,800$ rpm, the condition $[N_2/N_1] > 0.90$ and the condition $[N_2/N_1] < 1.05$ are satisfied. These signals are supplied to the AND circuit A 510. Since all the necessary inputs are applied to the AND circuit A 510, an output signal is delivered therefrom and is supplied to the bistable memory circuit 540. In this case, the speed changing region from low to high gear at the heavy load can be narrowed compared with that at the light load, and thus a sufficient acceleration or slope-ascending power can be obtained.

Figure 18:
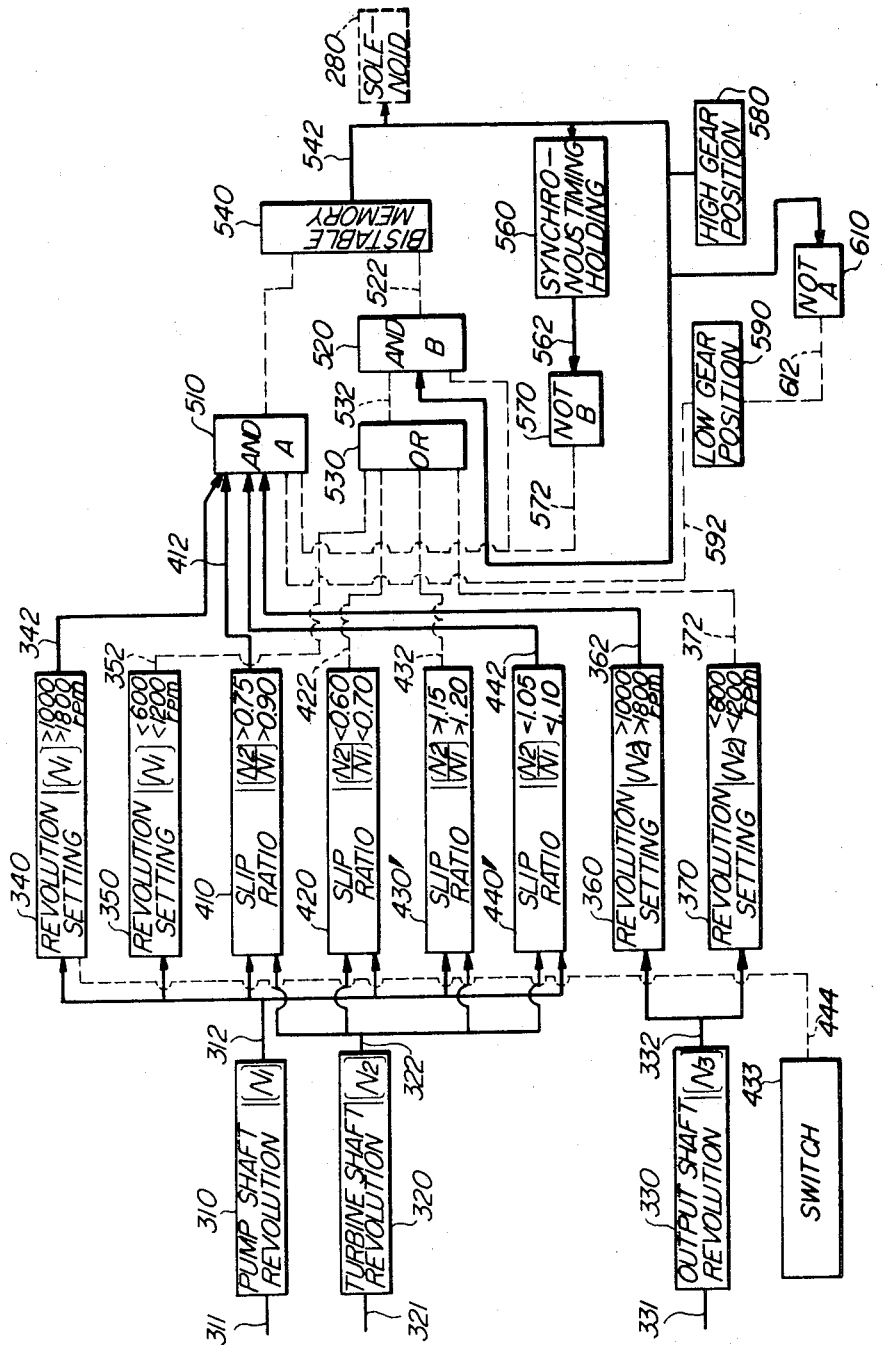
FIG. 18 is a block diagram illustrating the manner of logical operation under a continuous synchronous timing holding signal after gear changing from low to high gear.

The signal led into the bistable memory circuit 540 from the AND circuit A 510 drives same to a stable state ready for the supply of power to the solenoid 280, and power supply to the solenoid 280 is started at the same time as seen in FIG. 18. Therefore, the speed changing operations of the hydraulic actuating circuit and transmission unit are started.

Energization of the solenoid 280 means application of a voltage to same. This voltage is applied to the synchronous timing holding circuit 560 as an input signal thereto and the synchronous timing holding circuit 560 delivers a voltage signal which persists for a period of time $t$ or $t$ seconds. The NOT circuit B 570 immediately extinguishes the signal which has existed until then. Further, as a result of the application of voltage to the solenoid 280, a signal is delivered from the high gear position circuit 580 and no signal is now delivered from the low gear position circuit 590 since the NOT circuit A 610 does not deliver any signal. Since two signals among the input signals to the AND circuit A 510 do not exist, the output signal from the AND circuit A 510 disappears. However, the bistable memory circuit 540 is kept in the set state and the solenoid 280 is kept energized.

Figure 19:
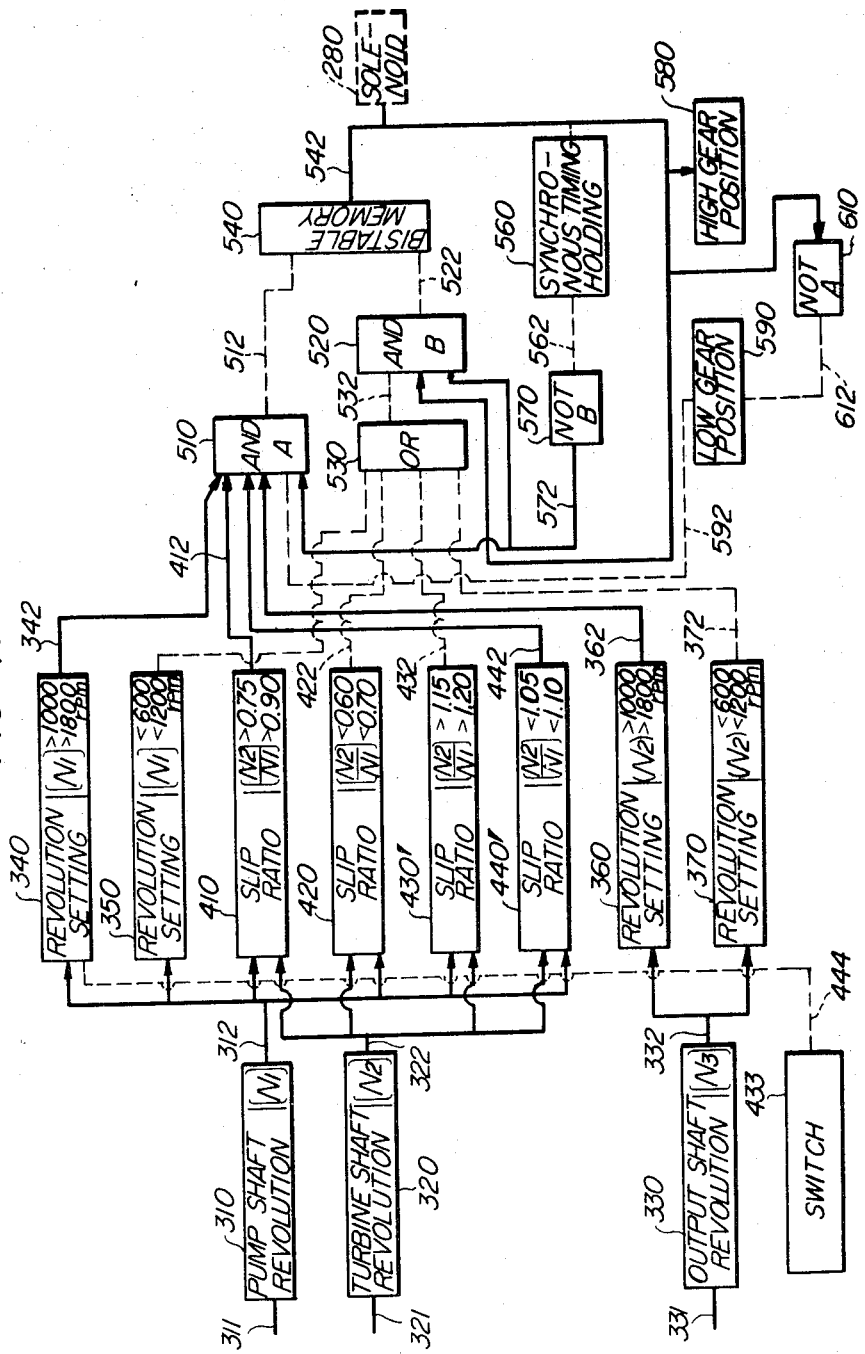
FIG. 19 is a block diagram illustrating the manner of logical operation under the disappearance of the synchronous timing holding signal after gear changing from low to high gear.

The NOT circuit B 570 delivers an output signal since the synchronous timing holding signal disappears after $t$ seconds as shown in FIG. 19. This signal and the high gear position signal are led to the AND circuit B 520. Such a state or more precisely the state shown in FIG. 19 is one form of the operating state of the control device during running of the vehicle when in high gear.

2. Logical operation for changing gear from high gear to low gear

In the case of changing gear from high gear to low gear, arithmetic and logical operations are carried out when the operating conditions of the torque converter are shifted to the outside of the speed changing region at a light load shown by the broken lines in FIG. 6a and to the outside of the speed changing region at a heavy load shown by the broken lines in FIG. 6b. The solenoid 280 is de-energized and the valve spool 272 of the distributing valve 270 is urged rightward to shift the hydraulic actuating circuit 230 from the state shown in FIG. 4 to the state shown in FIG. 3 with the result that the actuator shift the gear train 50 from high to low gear.

Figure 20:
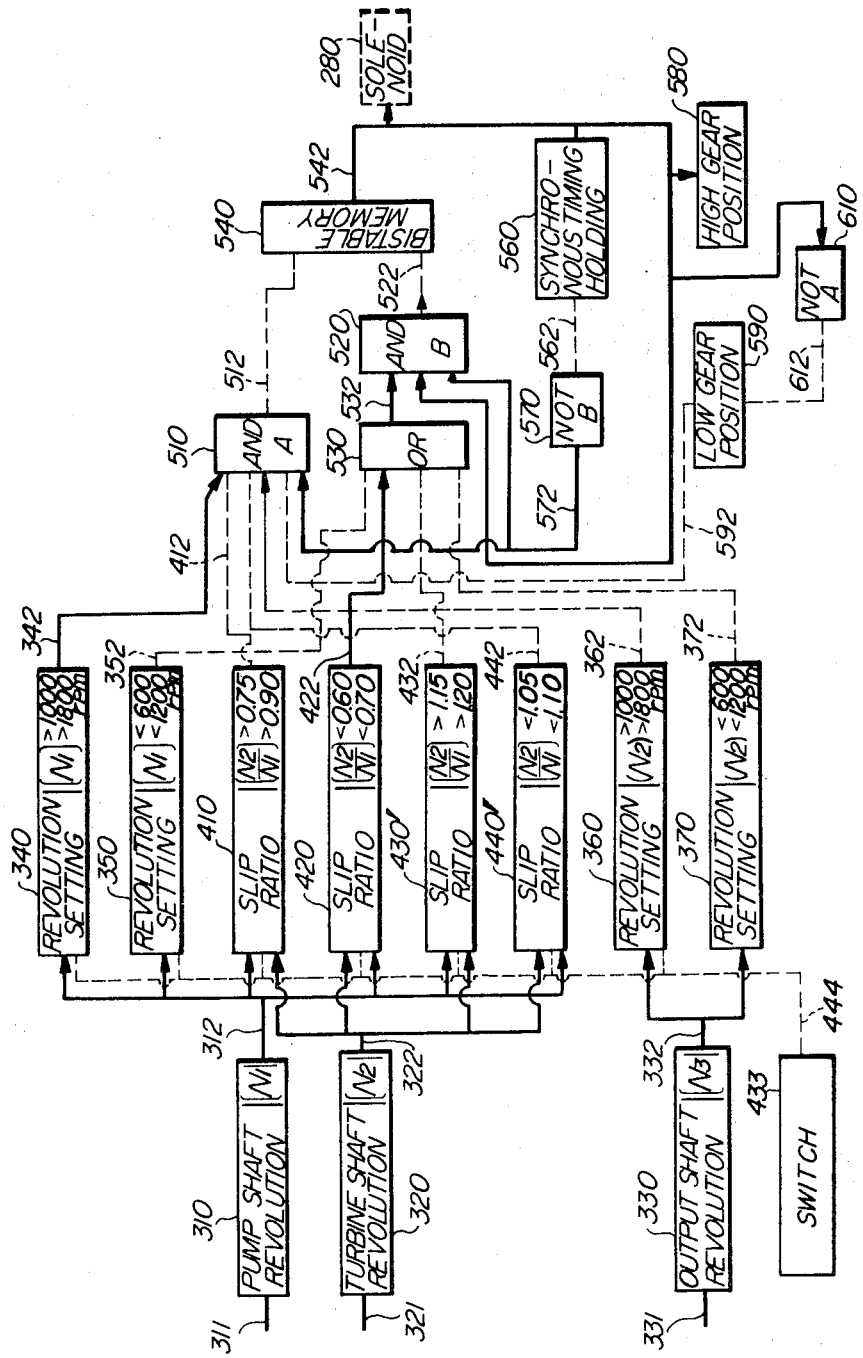
FIG. 20 is a block diagram illustrating the manner of logical operation when the slip ratio is reduced to a value less than 0.6 or 0.7 in the course of gear changing from high to low gear.

As seen in FIG. 20, the AND circuit A 510 ceases to deliver the output signal when any one of the input signals thereto including the revolution setting signals and slip signals disappears prior to the speed change, but the solenoid 280 is still kept in its energized state.

However, the output signal from the NOT circuit B 570 and the signal from the high gear position circuit 580 are applied to the AND circuit B 520. As the running state of the vehicle varies to such an extent that the slip ratio at a light load is now less than 0.6 and the slip ratio at a heavy load is less than 0.7, an output signal is delivered from the slip operating circuit $([N_2/N_1] < 0.60$ and $[N_2/N_1] < 0.70)$ 420 and is applied to the OR circuit 530 as seen in FIG. 20. The OR circuit 530 immediately supplies the output signal to the AND circuit B 520. The AND circuit B 520 immediately delivers an output signal because it has all of its inputs.

Figure 21:
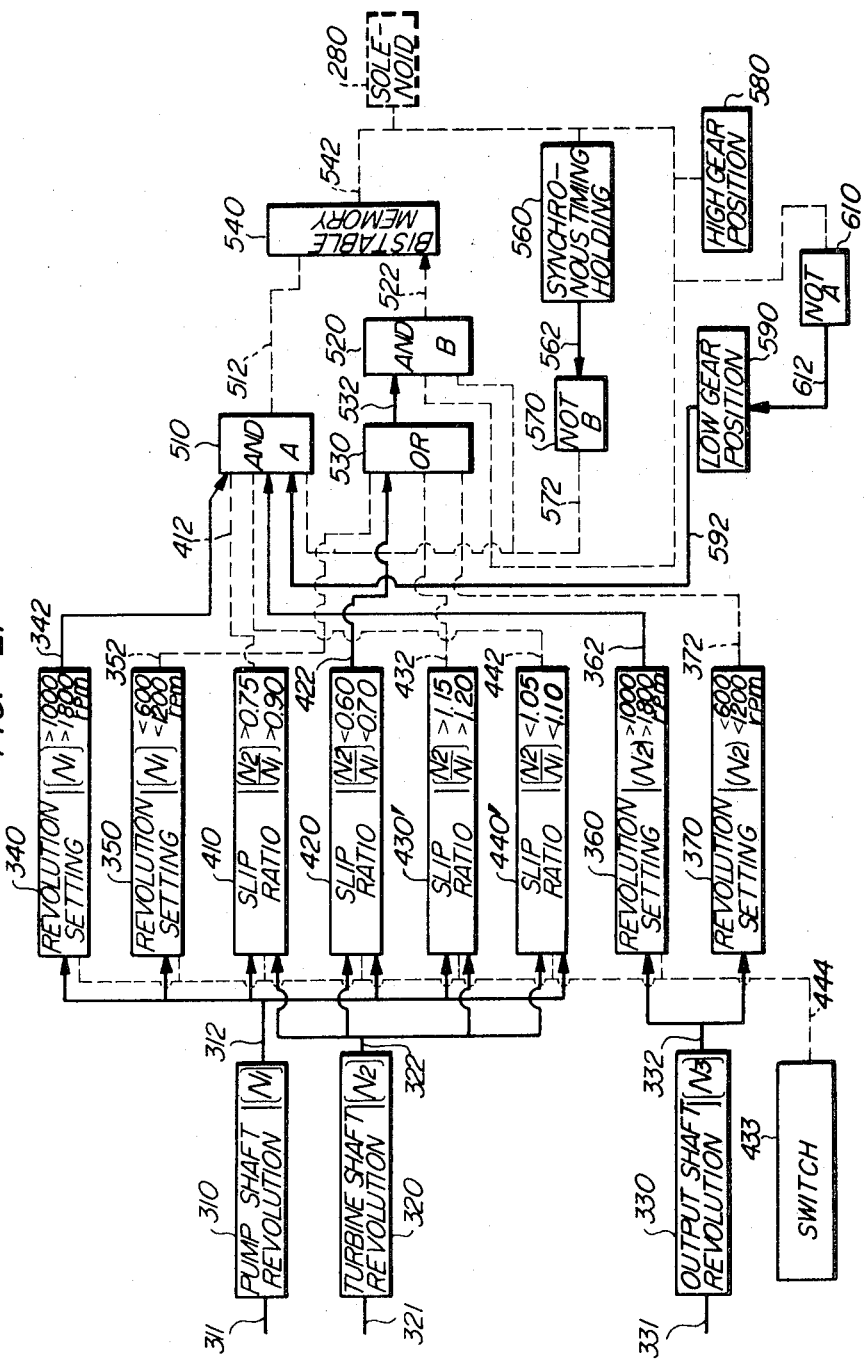
FIG. 21 is a block diagram illustrating the manner of logical operation under a continuous synchronous timing holding signal after gear changing from high to low gear.

The output signal from the AND circuit B 520 is led into the bistable memory circuit 540 as seen in FIG. 21 with the result that the stable state of the bistable memory circuit 540 is inverted and the solenoid 280 is de-energized at the same time. Since, at this time, the synchronous timing holding circuit 560 delivers a signal for $t$ seconds, the NOT circuit B 570 ceases to supply the signal which has appeared on the lead 572. The output signal from the AND circuit B 520 disappears because the signal from the high gear position circuit 580 disappears also. After $t$ seconds, the signal from the synchronous timing holding circuit 560 disappears as seen in FIG. 22 in which it will be seen that the signal from the NOT circuit B 570 and the signal from the low gear position circuit 590 are supplied to the AND circuit A 510, that is, the vehicle is running in low gear.

Figure 22:
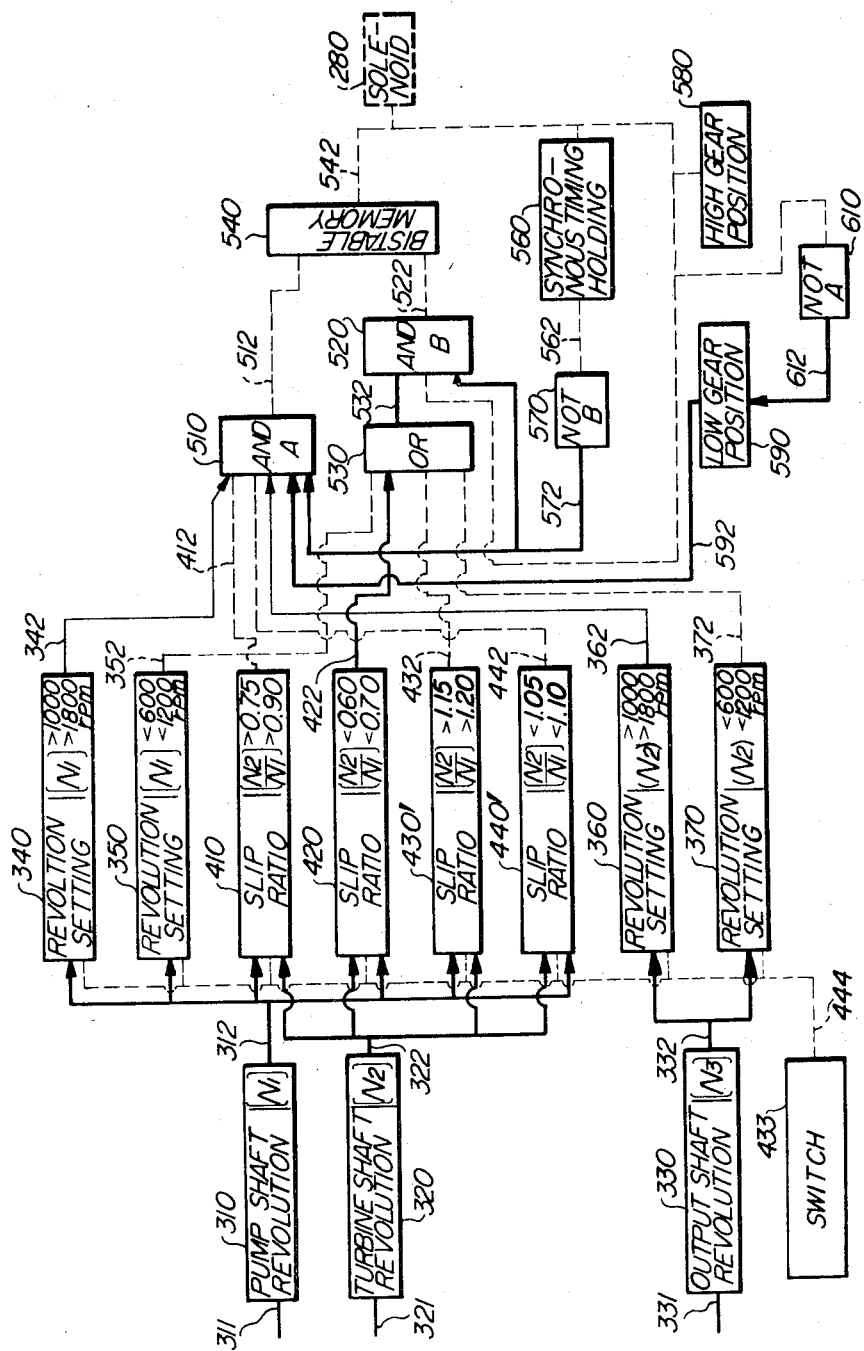
FIG. 22 is a block diagram illustrating the manner of logical operation under the disappearance of the synchronous timing holding signal after gear changing from high to low gear.

In FIGS. 20, 21 and 22, the signal from the revolution setting operating circuit $([N_1] > 1,000$ rpm and $[N_1] > 1,800$ rpm) 340 and the signal from the revolution setting operating circuit $(N_2) > 1,000$ rpm and $(N_2) > 1,800$ rpm 360 are shown by thin solid lines as they are independent of the above operation, and any explanation as to such signals will not especially be given herein.

The above description refers to the specific case in which the signal from the slip operating circuit ($[N_2/N_1]<0.60$ and $[N_2/N_1]<0.70$) 420 appears. It will be readily understood that, when any one of other signals such as the signal from the slip operating circuit ($[N_2/N_1]>1.15$ and $[N_2/N_1]>1.20$) 430 or the signal from the revolution setting operating circuit ($[N_1]<600$ rpm and $[N_1]<1,200$ rpm) 350 and the signal from the revolution setting operating circuit ($N_2)<600$ rpm and $(N_2)<1,200$ rpm) 370 appears, that signal is led to the OR circuit 530 so that an operation entirely the same as the operation described above is carried out to effect a gear change from high gear to low gear.

While the present invention has been described with particular reference to a two-forward speed automatic transmission system, it will easily be understood that it is also applicable to a three-forward speed automatic transmission system or to a multi-speed automatic transmission system. In such a case too, arithmetic operation of the slip ratio of the torque converter, arithmetic operations of the setting of the number of revolutions of the engine and of the revolutions representing the vehicle speed may similarly be carried out and these signals are used for the energization or de-energization of a solenoid or solenoids to change over one or a plurality of distributing valves (having a function the same as or similar to that of the distributing valve 270) by means of one or a plurality of solenoids (having a function the same as or similar to that of the solenoid 280) so that the gear position can be changed from low gear to high gear, that is, from 1st gear to 2nd, 2nd gear to 3rd, and so on, and the gear position can be changed from high gear to low gear, that is, from 2nd gear to 1st, from 3rd gear to 2nd, and so on. It will be easily conceived from the present embodiment that automatic speed changing over three forward speeds may be attained by changing the speed changing points (lines) by changing the settings of the respective operating circuits including the revolution setting operating circuits and slip operating circuits. It is apparent that such a transmission unit is also included in the scope of the present invention.

While the speed changing points (lines) based on the number of revolutions $N_1$ of the shaft 11 of the torque converter pump 12 and the number of revolutions $N_2$ of the shaft 14 of the torque converter turbine 13 have been illustrated in the above by way of example, the speed changing points (lines) based on the number of revolutions of the engine and the negative pressure in the air intake manifold may be chosen as required. Such a modification is also included in the scope of the present invention.

Further, although the switch means 433 has been illustrated in the form in which it is directly controlled by hand, the switch means 433 may be controlled by foot. Further, non-automatic switch means operative in response to the accelerator pedal, in response to the brake pedal or in response to the change lever may be employed in lieu of the hand-actuated switch means. An automatic switch means operative in response to the inclination of a road is also included in the scope of the present invention.

The embodiment of the present invention has been described as having an electrical control device comprising operating circuits and logic circuits. Where, however, the negative pressure in the air intake manifold and the number of revolutions of the engine, for example, are employed as the main factors for determining the speed changing points, the electrical control device may be of any other suitable structure.

In the above embodiment, all the settings of the electrical control device are changed by the switch means. However, changing of a part of the setting of the electrical control device by the switch means is also included in the scope of the present invention.

What is claimed is:

1. An automatic transmission system having a plurality of speed changing regions and including:

a transmission unit equipped with an input shaft, a torque converter including a pump operatively connected with the input shaft of said transmission unit and a turbine, speed changing gear means including an input shaft operatively connected with said turbine and frictionally engaging means for accomplishing the selective meshing engagement of gears in the speed changing gear means, a source of fluid pressure, and a hydraulic actuating circuit including a gear position setting valve and a distributing valve for distributing hydraulic fluid from said source to said frictionally engaging means for controlling said frictionally engaging means;

said system further comprising first signal generating means, connected to said torque converter pump for generating a signal which is proportional to the rotating speed of said pump, second signal generating means connected to said torque converter turbine for generating a signal which is proportional to the rotating speed of said turbine, an operating circuit including a first revolution variable setting operating circuit connected to said first signal generating means for generating an electrical signal when the signal from said first signal generating means satisfies one of a plurality of settings, a second revolution variable setting operating circuit connected to said second signal generating means for generating an electrical signal when the signal from said second signal generating means satisfied one of a plurality of settings and a variable setting slip operating circuit operative by receiving the electrical output signals from said first and second signal generating means for generating a signal when the ratio between the rotating speed of said pump and the rotating speed of said turbine satisfies one of a plurality of settings, a logic circuit operative in response to output signals from said operating circuit to actuate the distributing valve in said hydraulic actuating circuit, and switch means connected with operating circuit for changing each one of the settings of said first and second revolution setting operating circuits and said slip operating circuit to another depending on the position of said switch means to effect selection of said speed changing regions.

2. An automatic transmission system for use with an engine for a vehicle, comprising:

a transmission unit equipped with an input shaft and an output shaft, a torque converter including a torque converter pump operatively connected with the input shaft of said transmission unit and a torque converter turbine having an output shaft, speed changing gear means including gears for establishing at least a plurality of forward gear ratios and being connected to said turbine output shaft and including frictionally engaging means for accomplishing the selective meshing engagement of gears in the speed changing gear means of said transmission unit for changing the operative gear ratio of said gears, a source of fluid pressure, and a hydraulic actuating circuit including a gear position setting valve and a distributing valve for distributing hydraulic fluid from said source to said frictionally engaging means for controlling said frictionally engaging means;

first signal generating means connected to said torque converter pump for generating a signal which is proportional to engine speed, second signal generating means connected to one of said output shafts for generating a signal which is proportional to vehicle speed, a first revolution setting operating circuit having a plurality of first selectable circuits for effecting different minimum engine speed shift up settings and a plurality of second selectable circuits for effecting different maximum engine speed shift down settings and being connected to said first signal generating means for generating an electrical shift up signal when engine speed exceeds a selected one of said minimum engine speed shift up settings and for generating an electrical shift down signal when engine speed goes below a selected one of said maximum engine speed shift down settings, a second revolution setting operating circuit having a plurality of first selectable circuits for effecting different minimum vehicle speed shift up settings and a plurality of second selectable circuits for effecting different maximum vehicle speed shift down settings and being connected to said second signal generating means for generating an electrical shift up signal when vehicle speed exceeds a selected one of said minimum vehicle speed shift down settings and for generating an electrical shift down signal when said vehicle speed goes below a selected one of said maximum vehicle speed shift down settings, means, including a plurality of torque converter slip ratio determining circuits each having a respective selectable circuit for selecting as between a plurality of slip ratio settings and being connected to both of said generating means, for producing a plurality of complete selectable sets of shift up and down signals for all said forward gear ratios, said plurality of selectable circuits of said first and second revolution setting operating circuits and each of said slip ratio determining circuits being divided into a plurality of sets of selectable circuits with each set containing a different selectable circuit from each of said first and second operating circuits and each of said ratio determining circuits, multiple position switch means connected to each of the said selectable circuits for selecting any one set thereof, and means including logic circuits adapted to be operatively connected to outputs of said selectable circuits and to said distributing valve for operating on the said shift up and down signals resulting form the instant selected complete set of selectable circuits respectively to cause actuation of said distributing valve for an automatic shift up and down in said forward gear ratios.

3. In an automatic transmission system for use with an engine for a vehicle and of the type including a transmission unit equipped with a torque converter, speed changing gear means including gears for establishing at least a plurality of forward gears ratios and being connected to said torque converter and including frictionally engaging means for accomplishing the selective meshing engagement of gears in the speed changing gear means of said transmission unit for changing the operative gear ratio of said gears, and means for automatically controlling said frictionally engaging means upon receipt of shift signals;

the improvement comprising;

first signal generating means for generating a signal which is proportional to engine speed, second signal generating means for generating a signal which is proportional to vehicle speed, a first revolution setting operating circuit having a plurality of first selectable circuits for effecting different minimum engine speed shift up settings and a plurality of second selectable circuits for effecting different maximum engine speed shift down settings and being connected to said first signal generating means for generating an electrical shift up signal when engine speed exceeds a selected one of said minimum engine speed shift up settings and for generating an electrical shift down signal when engine speed goes below a selected one of said maximum engine speed shift down settings, a second revolution setting operating circuit having a plurality of first selectable circuits for effecting different minimum vehicle speed shift up settings and a plurality of second selectable circuits for effecting different maximum vehicle speed shift down settings and being connected to said second signal generating means for generating an electrical shift up signal when vehicle speed exceeds a selected one of said minimum vehicle speed shift down settings and for generating an electrical shift down signal when said vehicle speed goes below a selected one of said maximum vehicle speed shift down settings, means, including a plurality of torque converter slip ratio determining circuits each having a respective selectable circuit for selecting as between a plurality of slip ratio settings and being connected to both of said generating means, for producing a plurality of complete selectable sets of shift up and down signals for all said forward gear ratios, said plurality of selectable circuits of said first and second revolution setting operating circuits and each of said slip ratio determining circuits being divided into a plurality of sets of selectable circuits with each set containing a different selectable circuit from each of said first and second operating circuits and each of said ratio determining circuits, multiple position switch means connected to each of the said selectable circuits for selecting any one set thereof, and means including logic circuits adapted to be coupled to said selectable circuits for operating on the said shift up and down signals resulting from the instant selected set of selectable circuits respectively to develop automatic shift up and down signals for connection with said controlling means to cause changes in said forward gear ratios.

* * * * *

UNITED STATES PATENT OFFICE
CERTIFICATE OF CORRECTION

Patent No. 3,693,479     Dated     September 26, 1972

Inventor(s) Eiji Toyoda, et al

It is certified that error appears in the above-identified patent and that said Letters Patent are hereby corrected as shown below:

In the heading under Assignees, read:

"Toyota Jidosha Kogyo Kabushiki Kasha"

as --Toyota Jidosha Kogyo Kabushiki Kaisha--

Signed and sealed this 8th day of May 1973.

(SEAL)
Attest:

EDWARD M. FLETCHER, JR.
Attesting Officer

ROBERT GOTTSCHALK
Commissioner of Patents